(12) United States Patent
Asao et al.

(10) Patent No.: US 7,379,080 B2
(45) Date of Patent: May 27, 2008

(54) COLOR DISPLAY DEVICE AND DRIVING METHOD THEREOF

(75) Inventors: Yasufumi Asao, Atsugi (JP); Ryuichiro Isobe, Atsugi (JP)

(73) Assignee: Canon Kabushiki Kaisha, Tokyo (JP)

( * ) Notice: Subject to any disclaimer, the term of this patent is extended or adjusted under 35 U.S.C. 154(b) by 496 days.

(21) Appl. No.: 11/171,191

(22) Filed: Jul. 1, 2005

(65) Prior Publication Data

US 2006/0012614 A1  Jan. 19, 2006

(30) Foreign Application Priority Data

| May 14, 2004 | (JP) | ............................. 2004-145727 |
| May 6, 2005 | (JP) | ............................. 2005-135302 |
| May 13, 2005 | (JP) | ....................... PCT/JP05/09212 |

(51) Int. Cl.
*G09G 5/10* (2006.01)
(52) U.S. Cl. ........................................ 345/690; 345/84
(58) Field of Classification Search ................ 345/72, 345/77, 83–84, 87–90, 92, 204, 214, 690; 348/30, 70, 71
See application file for complete search history.

(56) References Cited

U.S. PATENT DOCUMENTS

| 6,014,195 | A | 1/2000 | Sakamoto et al. ............ 349/96 |
| 2005/0083353 | A1* | 4/2005 | Maruyama et al. ......... 345/690 |
| 2005/0243047 | A1* | 11/2005 | Asao ........................... 345/88 |
| 2006/0017750 | A1* | 1/2006 | Asao ........................... 345/690 |
| 2006/0050033 | A1 | 3/2006 | Asao et al. ................... 345/88 |
| 2006/0170712 | A1* | 8/2006 | Miller et al. ................ 345/695 |

FOREIGN PATENT DOCUMENTS

| JP | 6-175125 A | 6/1994 |
| JP | 9-113868 A | 5/1997 |
| JP | 9-230310 A | 9/1997 |
| JP | 9-251160 A | 9/1997 |
| WO | 2004/042687 A | 5/2004 |

* cited by examiner

OTHER PUBLICATIONS

Okumura, H., et al., "32.3: A New Low-Image-Lag Drive Method for Large-Size LCTV's", SID 92 Digest, 1992, pp. 601-604.

*Primary Examiner*—Richard A. Hjerpe
*Assistant Examiner*—Mansour M. Said
(74) *Attorney, Agent, or Firm*—Fitzpatrick, Cella, Harper & Scinto

(57) ABSTRACT

Unit pixels in a color display device each include a first and a second subpixel. The second is provided with a color filter, and each has a medium changing optical properties (hue and brightness of transmitted light) depending on an applied voltage. A voltage is applied to the first subpixel to modulate those optical properties of the medium, and a voltage is applied to the second subpixel to modulate the brightness of light passing through the medium disposed at the second subpixel. When display of the color display device is switched, a correction voltage of the second subpixel is calculated from a voltage applied to the first subpixel before the display is switched and a voltage applied to the first subpixel after the display is switched, and the voltage applied to the second subpixel is set to a value obtained by superposing the correction voltage on a voltage determined by the display at the second subpixel in a predetermined period after the voltage applied to the first subpixel is switched. The correction voltage modifies the color of the second subpixel so as to produce an achromatic color at that unit pixel by mixing a chromatic color, transitionally appearing at the first subpixel when the display is switched, with the color of the second subpixel.

5 Claims, 13 Drawing Sheets

COLOR DISPLAY DEVICE AND DRIVING METHOD THEREOF

TECHNICAL FIELD

The present invention relates to a color display device.

BACKGROUND OF THE INVENTION

Heretofore, there is a display apparatus provided with a display device which effects color display depending on three types of signals corresponding to images of three colors of red, green and blue. As such a display apparatus, there are various display devices such as CRT, plasma display (PDP), organic EL display (OLED), and these display apparatuses have already been widely put into practical use. Among them, the LCD has characteristics, such as a thin shape, a low power consumption, and a high display quality, so that it is applied to every color display apparatus, such as a cellular phone, a monitor for PC, a home television, and the like.

Almost all the color display methods of the LCD employ a microcolor filter (MCF) method wherein a liquid crystal display device capable of performing monochromatic modulation is used and one pixel is divided into three subpixels which are provided with color filters of red, green and blue, respectively. As a color display method different from this, a field sequential color (FSC) method wherein a display state of a liquid crystal display device capable of performing monochromatic modulation is switched at high speed and light sources of red, green and blue are synchronized with the display device, thereby to utilize a color mixture effect of the three primary colors by time division.

On the other hand, in the conventional LCDs, there are those with no color filter and there have been known a liquid crystal display apparatus of ECB-type (electrically controlled birefringence (effect)-type) proposed in U.S. Pat. No. 6,014,195 or Japanese Laid-Open Patent Application No. Tokkaihei 6-175125.

In the case of the liquid crystal display device of a transmission-type, linearly polarized light which comes in through one of polarization plates is changed into elliptically polarized light consisting of respective wavelength light fluxes different in state of polarization by the action of birefringence of liquid crystal layer in a process of transmitting a liquid crystal cell. The elliptically polarized light enters the other polarization plate and the transmitted light having passed through the other polarization plate is colored light consisting of light fluxes of colors corresponding to light intensities of the respective wavelength light fluxes.

More specifically, the ECB-type liquid crystal display apparatus (hereinafter, referred to as an ECB color LCD) is capable of coloring light by utilizing the birefringence action of the liquid crystal layer of the liquid crystal cell and the polarization action of polarization plate, so that it causes no light absorption by the color filter, thus effecting bright color display at a high transmittance of light. In addition, the birefringence of the liquid crystal layer is changed depending on a voltage applied to the liquid crystal cell, so that by controlling the voltage applied to the liquid crystal cell, it is possible to change the color of the transmitted light or the reflected light. By this, it is possible to display a plurality of colors at the same pixel.

FIG. 15 is a diagram showing a relationship between an amount of birefringence (called retardation R) of liquid crystal display device used in the ECB color LCD and coordinates. According to this figure, it is found that the color at a retardation R from 0 to about 250 nm is achromatic color since the retardation range is located substantially at a center portion of the chromaticity diagram but is changed when the retardation exceeds the retardation range.

When a liquid crystal material having a dielectric anisotropy ($\Delta\epsilon$) which is negative is used as the liquid crystal and liquid crystal molecules thereof are homeotropically (vertically) aligned with respect to the substrates, the liquid crystal molecules are inclined with voltage, so that an amount of birefringence is increased with a degree of the inclination of the liquid crystal molecules.

In this case, in a cross-nicol condition, the chromaticity is changed along a curve indicated in FIG. 15. For example, when the voltage is not applied, the retardation R is substantially zero, so that light does not pass through the display device to provide a dark (black) state. With an increase in voltage, brightness (lightness) is increased in the order of black, gray, and white. When the voltage is further increased, the light is colored to change the color (hue) in the order of yellow, red, violet, blue, yellow, violet, light blue, and green.

As described above, under voltage application, the ECB color LCD at the vertical alignment mode is capable of changing the brightness between a maximum brightness and a minimum brightness in a modulation range on a low voltage side under and changing a plurality of hues in a higher voltage range.

And now, the LCD provides a high display quality even in motion picture display and has been applied to and developed into a big-screen television. Among others, an overdrive driving method (OD method) reported by H. Okumura et al., in SID '92, pp. 601-604 (1992) has been frequently used in the LCDs for motion picture display.

The OD method is used in order to improve a low halftone response speed of LCD. For example, in the LCD in a normally white mode (display mode in which white display is effected at the time of no voltage application), when a previous state of white is switched into a halftone level, a response time required for reaching an objective halftone level is shortened by setting a voltage value only in one frame immediately after the switching so as to be somewhat higher than a voltage value for displaying an original halftone level. When the previous state is black, the voltage value is set to be somewhat lower than the original voltage value. In a second frame or later, a drive voltage for displaying the original halftone level may be applied as usual.

By this method, optical response of the LCD can be completed in about one frame or within one frame.

As described above, by improving the response speed of liquid crystal in the monochromatic modulation area, it becomes possible to obtain a high-quality motion picture even in either of the MCF method or the FSC method.

Incidentally, as described above, in the conventional color LCD, although the response time is almost within one frame, it takes a time close to one frame with respect to halftone response.

When switching from white to an intermediary tone of blue in the LCD using the MCF method, all the subpixels of red, green and blue are placed in an ON state in the white state, and in the intermediary tone state of blue, the red and green subpixels are placed in an OFF state and the blue subpixel is placed in an intermediary brightness state. When response at this time is observed in detail, in a state immediately after the switching of voltage, the red and green subpixels are in a transition response state between the ON state and the OFF state and the blue subpixel is in a transition response state between the ON state of blue and the intermediary tone state of blue.

In other words, in the first frame immediately after the switching, red and green are in the respective intermediary tone states and blue is in an intermediary tone state brighter than a desired intermediary tone state after the switching. When this is viewed with eyes, it is possible to say that display of blue which is low in color purity and somewhat bright is effected.

Further, similarly, the display color is changed from black to the intermediary tone of blue, it is found that a color purity is the same as a desired one in the first frame immediately after the switching but somewhat dark blue display is effected.

As described above, even when the LCD has a response speed of about one frame period, complete display is not effected, so that in the first frame immediately after the switching, display somewhat different in brightness or color saturation is effected.

In the MCF method, as described above, the hue (or systematic color) is not largely changed, so that it is considered that looking and listening become possible without feeling large inconformity even in the case of displaying quick motion picture as in a liquid crystal television which is currently commercially available.

On the other hand, in the ECB color-type LCD, e.g., when switching from white to blue is performed, transitional response with a change in hue is observed in the first frame immediately after the switching. More specifically, in the transitional response state from white to blue, along a curved line shown in FIG. 15, intermediary display colors are represented in the order of yellow, red, and violet and thereafter blue display is effected.

In short, in the transitional response state, a display color, such as magenta, different in systematic color from blue is observed. Further, when such a display color different in systematic color is observed, coloring is observed at an edge portion of a moving body in the motion picture display to result in inconformity with respect to the motion picture display.

There is also the coloring case not only in the motion picture display but also when switching from a still picture (image) to another still picture is performed.

Further, in the case where dithering is used at the time of displaying natural picture, two-valued gradation control is effected at a unit pixel but gradation display by a spatial color mixture effect is performed, so that two-valued information to be displayed is largely changed even when an image is slightly changed. Accordingly, in the case where an image effecting natural picture display by dithering is displayed as motion picture, the change becomes a cause of destruction of color balance not only at the edge portion but also in the entire image.

DISCLOSURE OF THE INVENTION

The present invention has been accomplished in view of these circumstances and relates to a color display device (liquid crystal display device) which alleviates an undesirable coloring phenomenon occurring at an edge portion of a moving body or an entire image at the time of switching of image for motion picture display or the like and to a driving method thereof.

The present invention is a color display device wherein a unit pixel is constituted by a plurality of subpixels including a first subpixel and a second subpixel which is provided with a color filter, and a medium changing an optical property depending on an applied voltage is disposed at each of the subpixels; the color display device comprising:

means for applying, to the first subpixel, a voltage modulating the optical property of the medium disposed at the first subpixel in a range in which a brightness of light passing through the medium is changed and in a range in which the light passing through the medium assumes a chromatic color and a hue of the chromatic color is changed, and means for applying, to the second subpixel, a voltage modulating the optical property of the medium disposed at the second subpixel in a range in which a brightness of light passing through the medium is changed;

wherein the color display device further comprises means calculating, when display of the color display device is switched, a correction voltage of the second subpixel from a voltage applied to the first subpixel before the display is switched and a voltage applied to the first subpixel after the display is switched, and means applying, as a voltage applied to the second subpixel, a voltage obtained by superposing the correction voltage on a voltage determined by the display at the second subpixel in a predetermined period after the voltage applied to the first subpixel is switched; and wherein the correction voltage is a voltage which modifies a color of the second subpixel so as to produce an achromatic color by mixing a chromatic color, transitionally appearing at the first subpixel when the display is switched, with the color of the second subpixel.

As in the present invention, when image switching is performed by dividing a pixel into a first subpixel and a second subpixel provided with a color filter of any one species of red, green and blue and performing modulation of a hue change range at the first subpixel, a predetermined amount obtained from applied voltages before and after switching at the first subpixel is outputted by being superposed on a modulation amount with respect to the second subpixel in a predetermined period of time, so that it is possible to alleviate inconformity at the time of motion picture display.

BEST MODE FOR CARRYING TO THE INVENTION

Hereinbelow, a bestmode for carrying out the present invention will be described in detail with reference to the drawings.

Figure 1:
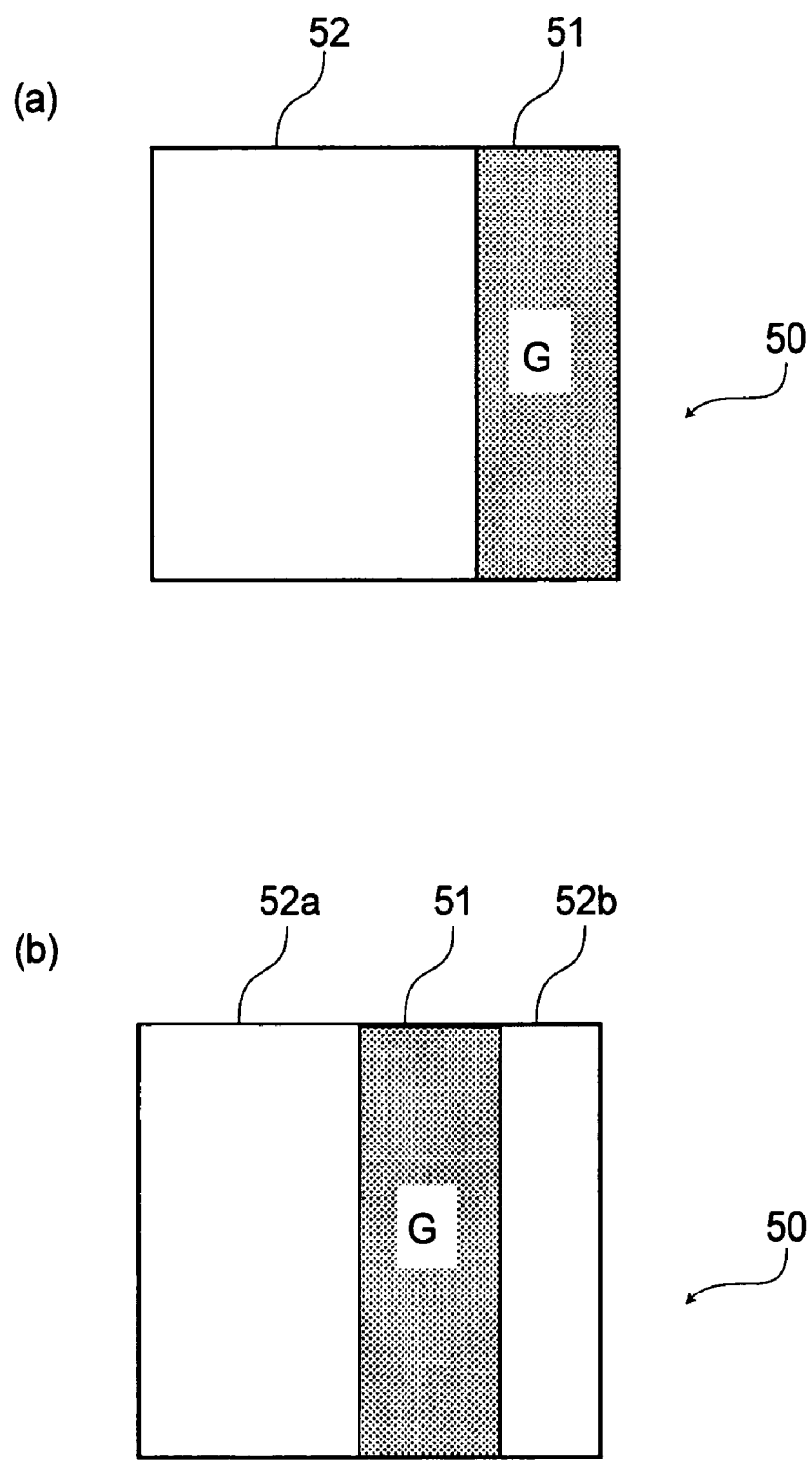
FIGS. 1(a) and 1(b) are views showing one pixel structure of a liquid crystal display device (color display device) used in a color display apparatus of the present invention.

FIGS. 1(a) and 1(b) are views showing a structure of one pixel of a color display device used in a color display apparatus according to the bestmode for carrying out the present invention. A color display device having the same structure has been proposed by the inventor of this application in WO 2004/042687.

Next, a color display operation principle of this color display device will be described. Incidentally, to the color display device used in the present invention, those of various modes are applicable but a display principle thereof will be described while taking a liquid crystal display device using a liquid crystal having an ECB effect as an example.

In the liquid crystal display device (color display device) usable in the present invention, as shown in FIG. 1(a), one pixel 50 is divided into a plurality (two) of subpixels 51 and 52, and one subpixel 51 is provided with a green color filter represented by G and at the other subpixel 52, by adjusting a retardation of a liquid crystal layer thereof voltage application, a change in brightness of an achromatic color from black to white and display of any color from red to blue through green are achieved.

More specifically, a unit pixel is constituted by a first subpixel 51 at which chromatic color is displayed by changing the retardation of the liquid crystal layer under voltage application and a second subpixel 52 at which a gradation color filter is provided and the color (gradation) of the color filter is displayed by changing the retardation in a brightness change range through voltage. In short, at the subpixel 51 for displaying green having a high luminosity factor (hereinafter, referred to as a gradation subpixel), the green color filter G is used without utilizing an ECB effect-based coloring phenomenon, which is utilized for only red and blue.

The green subpixel 51 provided with the color filter is placed in the dark state and the subpixel 52 provided with no color filter (hereinafter, referred to as a transparent subpixel) is placed in the white state (a maximum brightness state in a change area of achromatic color), whereby white is displayed at the pixel as a whole.

Further, it is also possible to place the gradation subpixel 51 in a maximum transmission state and place the transparent subpixel 52 in a magenta (display) state in the chromatic color area. The magenta includes both red (R) and blue (B), so that it is possible to attain white display as the result of color composition.

In order to effect the single color display of green (G), the gradation subpixel 51 is placed in the maximum transmission state and the transparent subpixel 52 is placed in the dark state. In order to effect the single color display of red (R) (or blue (B)), the gradation subpixel 51 is placed in the dark state and the transparent pixel 52 is adjusted to provide a retardation value of 450 nm (or 600 nm). Further, using the above methods in combination, it is also possible to obtain mixed color of R and G or B and G.

Further, at both the G subpixel 51 and the transparent subpixel 52, it is needless to say that black display can be effected by providing these pixels with a retardation of zero to be placed in the dark state. Incidentally, the retardation referred to herein is an amount of the retardation itself of the liquid crystal layer in the case where the subpixels are used in a transmission type, and in the case where the subpixels are used in a reflection type, light passes through the liquid layer two times, so that a value obtained by doubling the retardation amount of the liquid crystal layer is used. Further, the use of a cross-nicol constitution for the transmission-type and the use of a circular polarization plate for the reflection type are assumed.

Further, in this constitution, at the gradation subpixel 51, the retardation is changed in the range of 0-250 nm and at the transparent subpixel 52, the retardation is changed both in the range of 0-250 nm and the range of 450-600 nm. At both the subpixels 51 and 52, the liquid crystal material is ordinarily used in common, so that a drive voltage range is set to be different between the sub-pixels.

When the green color filter is selected, production of gradation by a high retardation (about 1300 nm in FIG. 15) can be avoided, so that it is not necessary to increase a cell thickness. Further, gradation has a high luminosity factor, so that a high-quality image is obtained when a high-purity color is produced by the color filter.

Incidentally, as described above, when the constitution is such that gradation is displayed by the color filter and other colors are displayed by colors produced by a medium (the liquid crystal in the above described case) itself, the constitution is applicable to display devices other than the liquid crystal (display device). In other words, generally, a medium which changes an optical property by externally applied modulation means may be used and the medium may exhibit a modulation area changing a blue by the modulation means and a modulation area changing a hue by the modulation means.

Figure 15:
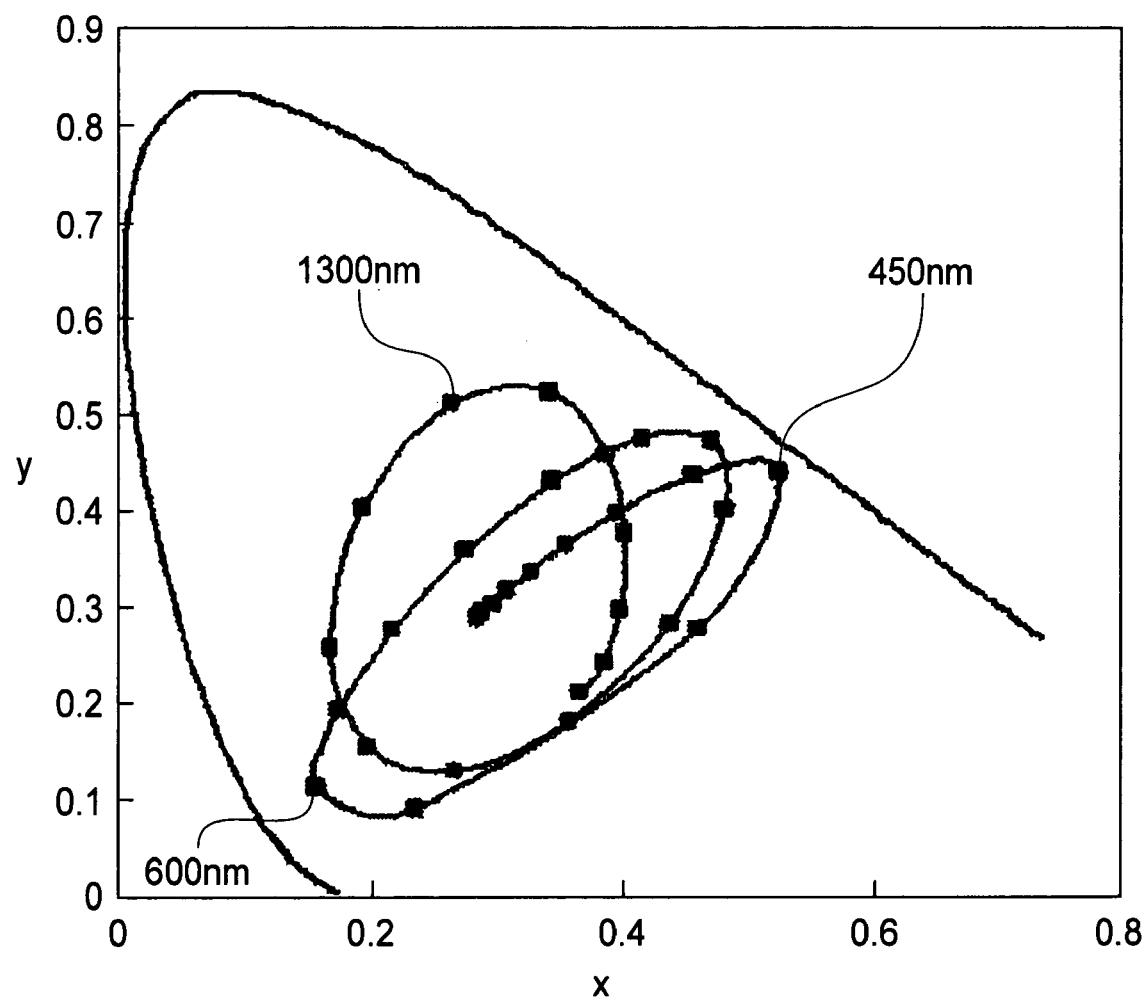
FIG. 15 is a diagram showing a relationship between a retardation and a color of a liquid crystal display device.

As shown in FIG. 15, a retardation for red display is about 450 nm and a retardation for blue display is about 600 nm. Accordingly, a cell thickness is set so as to realize the retardation of 600 nm. In the case of using a general VA mode (vertical alignment mode) of a transmission-type, the cell thickness is about 10 microns.

In the case where the constitution is applied to a reflection-type liquid crystal display device, the cell thickness is halved, so that a response speed is of the order of that of a transmission-type LCD which is currently commercially available. As a result, it is possible to effect motion picture display.

Incidentally, in the liquid crystal display device shown in FIG. 2(a), with respect to the gradation subpixel 51 having a high luminosity factor, it is possible to effect the continuous gradation display. However, the transparent subpixel 52 utilizes the chromatic color state, i.e., the coloring by the ECB effect, so that the gradation display cannot be effected. In FIG. 1(b), the transparent subpixel 52 is divided into plural portions (N portions), i.e., two subpixels 52a and 52b and at the same time, an areal ratio therebetween is changed to represent gradation in a digital manner. The subpixels 52a and 52b have different areas, so that halftones at some levels are displayed depending on the areas of the subpixels at which lighting is performed to display a color.

A method of providing further many colors in the above described constitution will be described below. (1) Method utilizing coloring phenomenon based on the ECB effect also at a retardation values other than those for red and blue.

Figure 2:
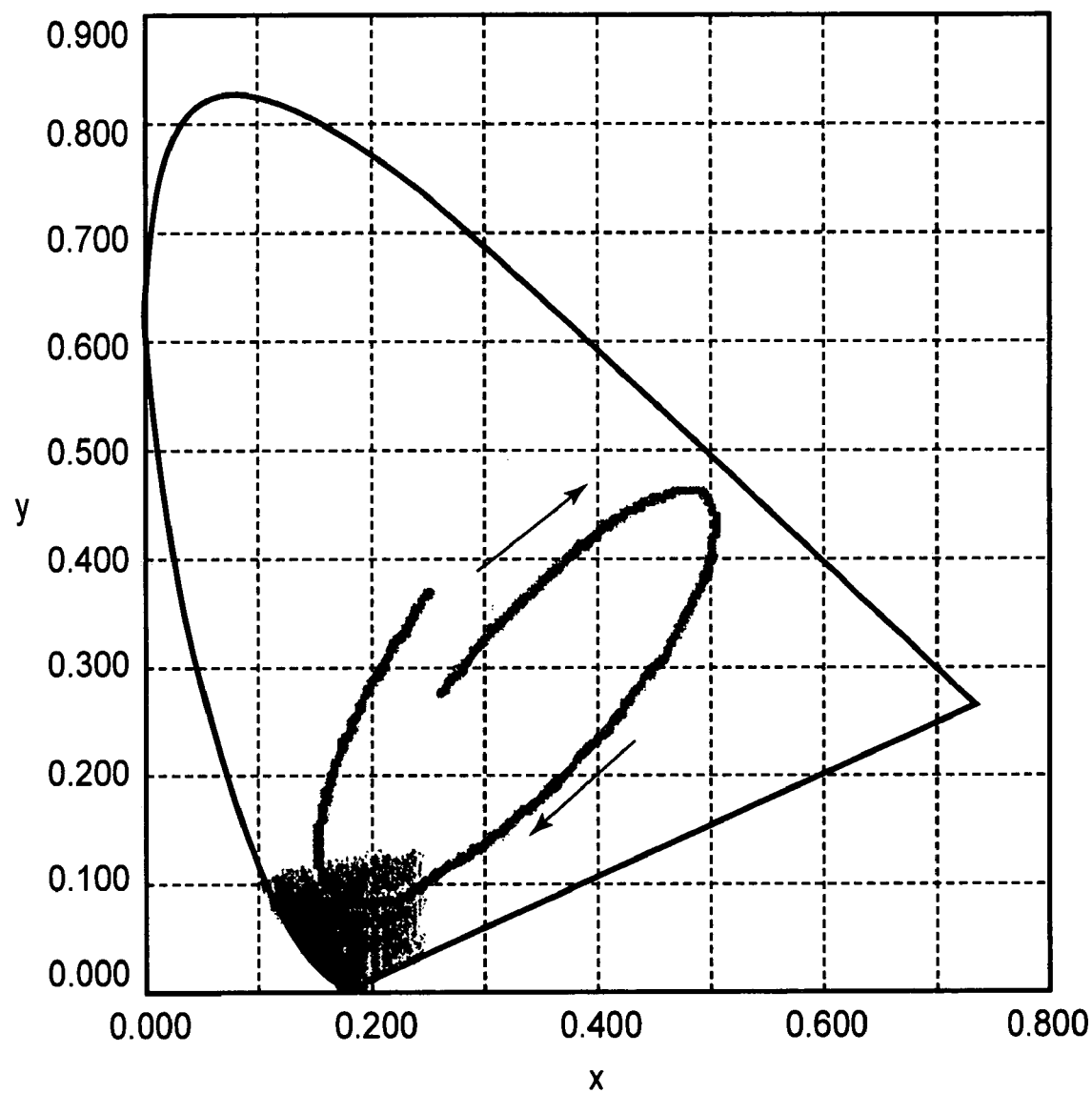
FIG. 2 is a diagram showing a relationship between a retardation and a color of the liquid crystal display device of FIGS. 1(a) and 1(b).

In the ECB method, as shown by arrows indicated in FIG. 2, such a change in brightness of achromatic color that the display state is changed from the black state to the white state via the gray (halftone) state with an increase in brightness from zero is caused to occur. Further, in a retardation range exceeding the white range, various chromatic colors are continuously changed in the order of yellow, yellowish red, red, reddish violet, violet, bluish violet, and blue, so that it is also possible to use colors other than red and blue for display.

(2) Method utilizing continuous gradation color in low retardation range at pixel provided with color filter of color complementary to green In this method, the first subpixel to be colored by the retardation change is provided with a color filter of color, such as magenta, complementary to green. As a result, it is possible to increase a color purity and provide a good color reproduction range of red and blue.

FIGS. 3(a) and 3(b) show such a pixel constitutions. A green pixel 51 is provided with a green color filter similarly as in the above described basic embodiment. Further, first subpixels 52 and 53, which are transparent, are provided with a magenta color filter indicated by M. Incidentally, FIG. 3(a) shows the case of one first subpixel, and FIG. 3(b) shows the case of two first subpixels divided into two portions at 2:1.

Figure 4:
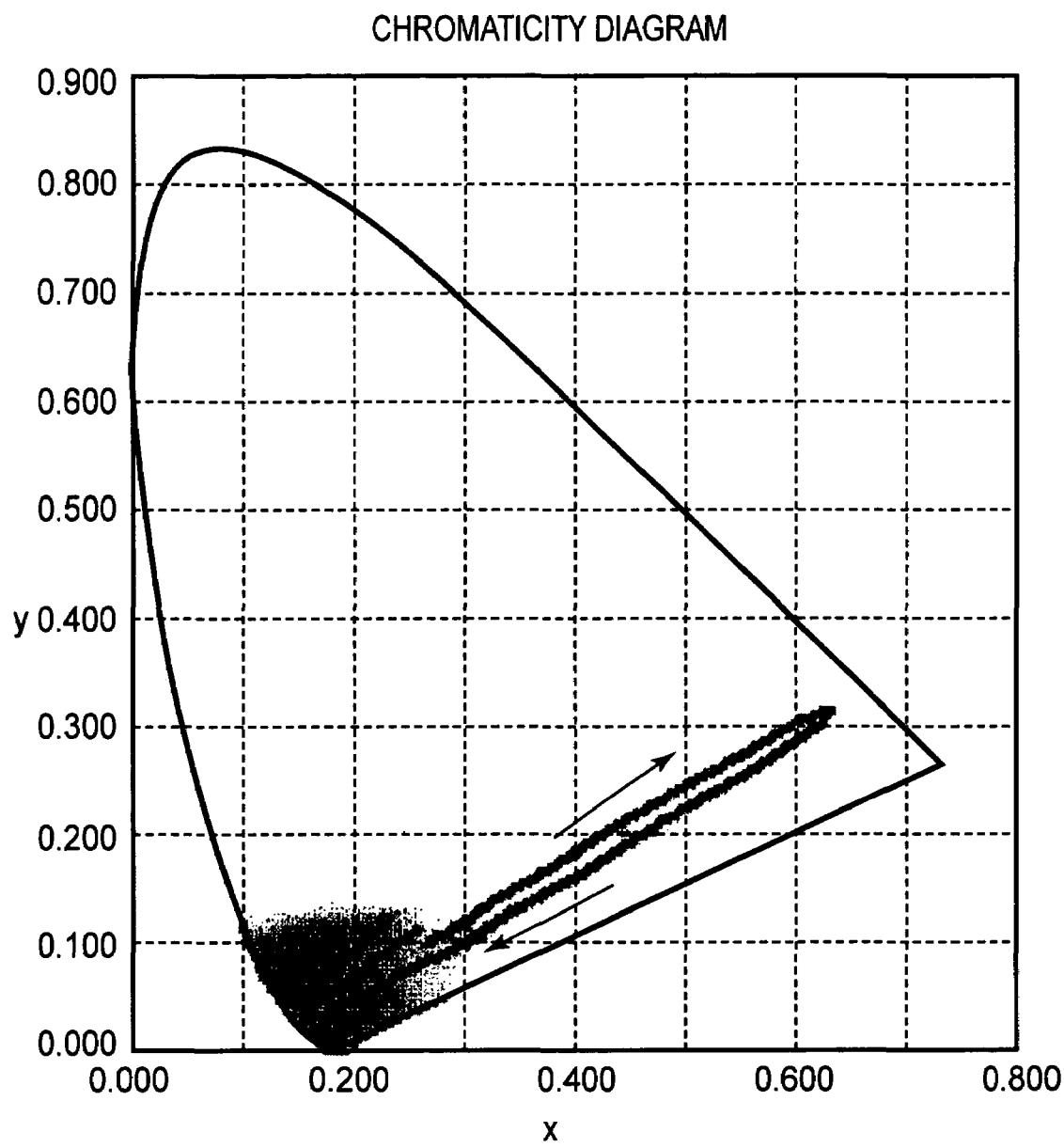
FIG. 4 is a diagram showing a relationship between a retardation and a color of the liquid crystal display device.

Herein, calculated values with respect to a change in color by retardation in the case where an ideal magenta color filter which provides a transmittance of zero in a wavelength range of 480-580 nm and a transmittance of 100% in other ranges is provided is shown in FIG. 4. In FIG. 4, as the retardation amount is increased from zero, such a brightness change of chromatic color that the display state is changed from the black state to a bright magenta state via a dark magenta state (halftone magenta state) is achieved. Thereafter, when the retardation amount is further increased and exceeds the white range in the above described embodiment in which the first subpixel 52 is not provided with the color filter, a continuous change in chromatic color in the order of magenta, red, reddish violet (magenta), violet and blue is achieved.

(3) Method adding pixel provided with at least either one of color filters for red and blue.

Figure 5:
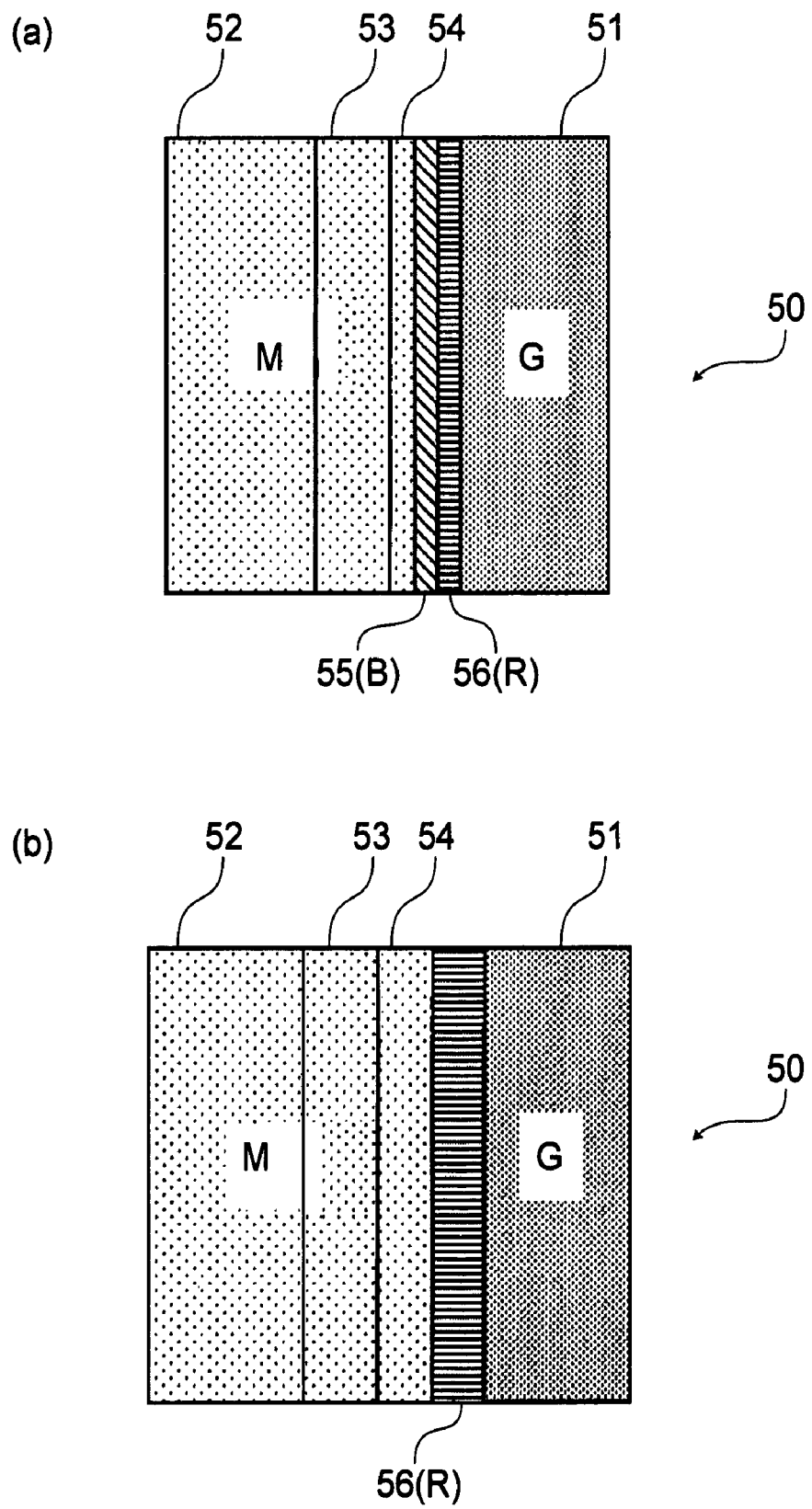
FIGS. 5(a) and 5(b) are views showing still another structure of one pixel of the liquid crystal display device used in the color display apparatus of the present invention.

Third and fourth subpixels 55 and 56 provided with color filters of red and blue are added as shown in FIG. 5(a). Here, at these subpixels 55 and 56, a continuous change in brightness of blue or red is achieved, so that it is possible to effect full-color display in combination with continuous gradation of green.

Incidentally, in this case, it is possible to achieve an effective result even when both of the red color filter and the blue color filter are not necessarily added. For example, FIG. 5(b) shows such an embodiment in which only the subpixel 56 provided with the red color filter is added. In the figure, in the red direction, all the colors are displayable but in the blue direction, there are colors which are not displayable. However, with respect to a human luminosity characteristic, blue is least sensitive, so that the number of necessary gradation levels is considered to be smallest.

In the above description, green having a high luminosity factor is independently treated and other colors are displayed at the pixels other than the green pixel by utilizing the coloring effect by birefringence. By doing so, it is most advantageous for displayablity of natural picture as described above. However, only green is not necessarily treated independently, it is also possible to utilize a method wherein the red pixel is treated as an independent pixel and blue and green are displayed by utilizing the coloring effect by birefringence or a method wherein the blue pixel is treated as the independent pixel and red and green are displayed by utilizing the coloring effect by birefringence.

Next, the motion picture display using the display device of the present invention will be described more specifically. As described above, in the ECB color method, when there is a transitional response time of about one frame, an irregularity in hue is observed at the time of motion picture display. Hereinbelow, this phenomenon and a measure thereto will be described below.

First, the phenomenon in the pixel constitution shown in FIG. 1(a) and the measure thereto will be described with reference to FIG. 6.

In FIG. 1(a), one pixel is divided into two types of subpixels and display of monochromatic color, red, and blue is effected through interference color by birefringence by disposing a green color filter to a first subpixel 52. Incidentally, this pixel may also be divided into a plurality of subpixels as desired.

The case where switching from blue to white is performed at this pixel is considered.

The first subpixel assumes blue before switching and assumes white by the switching. The second subpixel assumes black both of before and after the switching.

Figure 6:
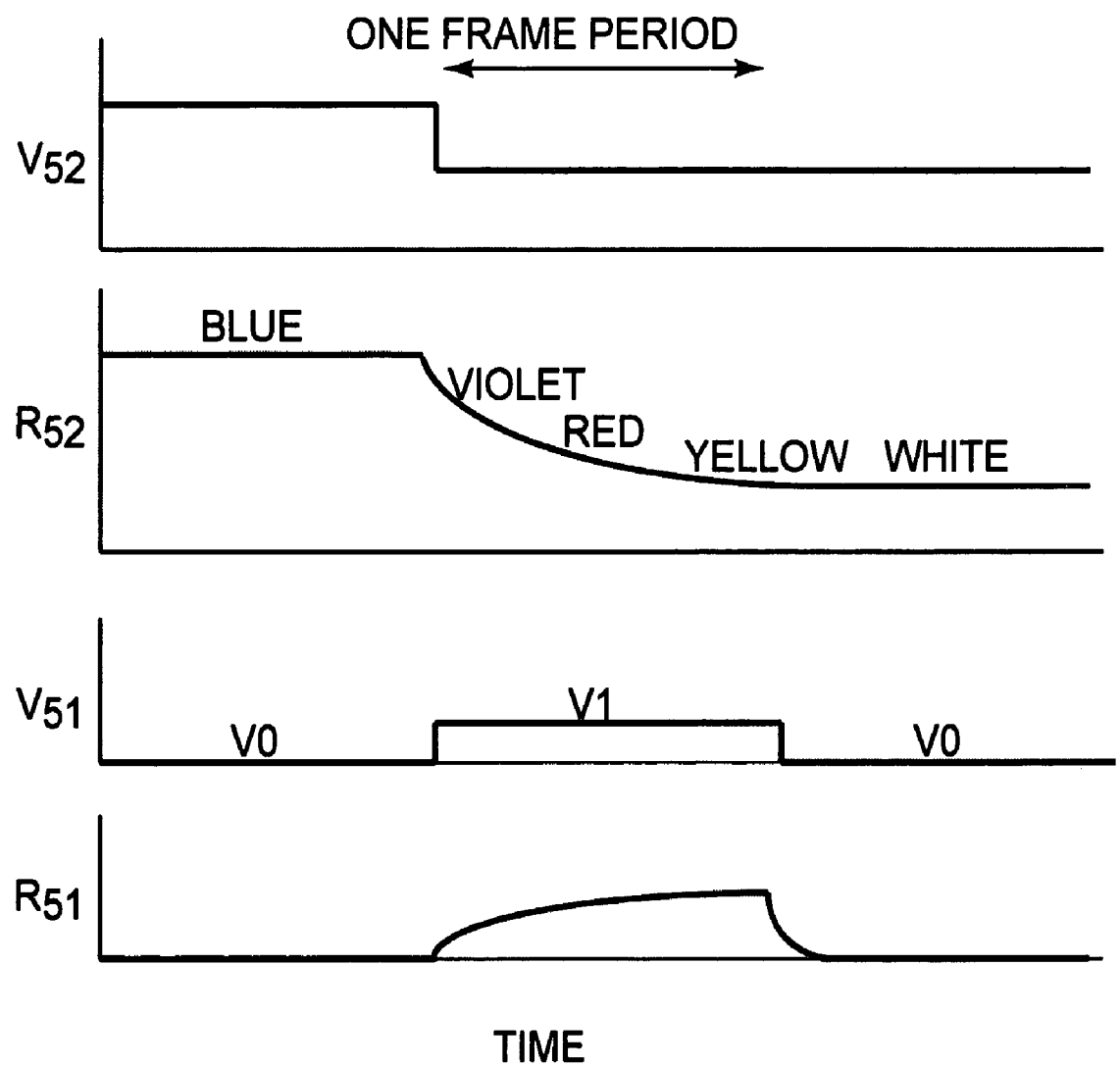
FIG. 6 is a diagram showing an applied voltage and a change in retardation with time of the color display apparatus of the present invention.

In FIG. 6, V52 represents an applied voltage to the first subpixel and R52 represents a response of retardation of the first subpixel. At the first subpixel, the retardation is changed from 600 nm for blue to 250 nm for white along the curved line of FIG. 15, so that in its transitional response state, violet (550 nm), red (450 nm), and yellow (350 nm) are successively observed. Values in the parentheses represent approximative values of retardation at that time.

The transitional response state is completed in about one frame, so that a mixed chromatic color of these colors is visually observed.

Incidentally, with respect to the mixed color of these colors, a systematic color close to magenta is displayed when spectral characteristics are taken into consideration. More specifically, when a condition that a blue body is moved on a white background is considered, an edge portion of the moving body is colored a display color of a magenta system, not a blue system or a white system. Such a phenomenon is visually recognized not only at the edge portion but at the time of switching a still picture image such as the case where the entire picture area is switched from blue to white.

Alternatively, such a phenomenon is also noticeably observed at the time of natural picture display using dithering. For example, in a basic constitution, in the case where dark blue is displayed, gradation display by a spatial color mixture, such as dithering, is used. In this case, when the case of slightly moving the dark blue body is considered, depending on pixels, a pixel displaying black before the movement displays blue after the movement and on the other hand, such a display that blue is displayed before the movement but black is displayed after the movement at a pixel. By this, the case where the display color of the magenta system being their transitional state is superposed on the entire moving body is caused to occur only by moving the dark blue body slightly.

Therefore, in the present invention, in order to alleviate such a phenomenon, in other words, in order to reduce inconformity at the time of image switching in a motion picture area or the like, at a pixel, where image switching in a hue change range is performed, such as one corresponding to the edge portion of the moving body, such a display color that it cancels the above described intended display color, i.e., that the unintended display color is made colorless by mixing is outputted to the first subpixel 52 simultaneously with such a drive control that the hue is changed at the second subpixel 51.

More specifically, the transitional response at the first subpixel 52 is observed as magenta averagely, so that voltage application is performed so as to place the second subpixel 52 in an ON state or an intermediary tone state.

In FIG. 6, V51 represents an applied voltage to the second subpixel and R51 represents a retardation at the second subpixel.

The applied voltage, as a voltage for original display, is V0=0 V because of black before and after the switching but a voltage V1 in a brightness change range is applied in one frame as the transitional response period. By that, the retardation shows a non-zero value in the brightness change range, so that green display is observed at the second subpixel only for one frame period.

As a result, a mixed color of the transitional color at the first subpixel and the transitional green at the second subpixel is observed. By adjusting the value of V1, the subpixels look substantially gray as a whole.

Further, by constituting the present invention as described above, it is possible to effect display of a monochromatic color which is a mixed color of magenta and green without causing magenta to be visually recognized in the transition state from blue to white.

Figure 7:
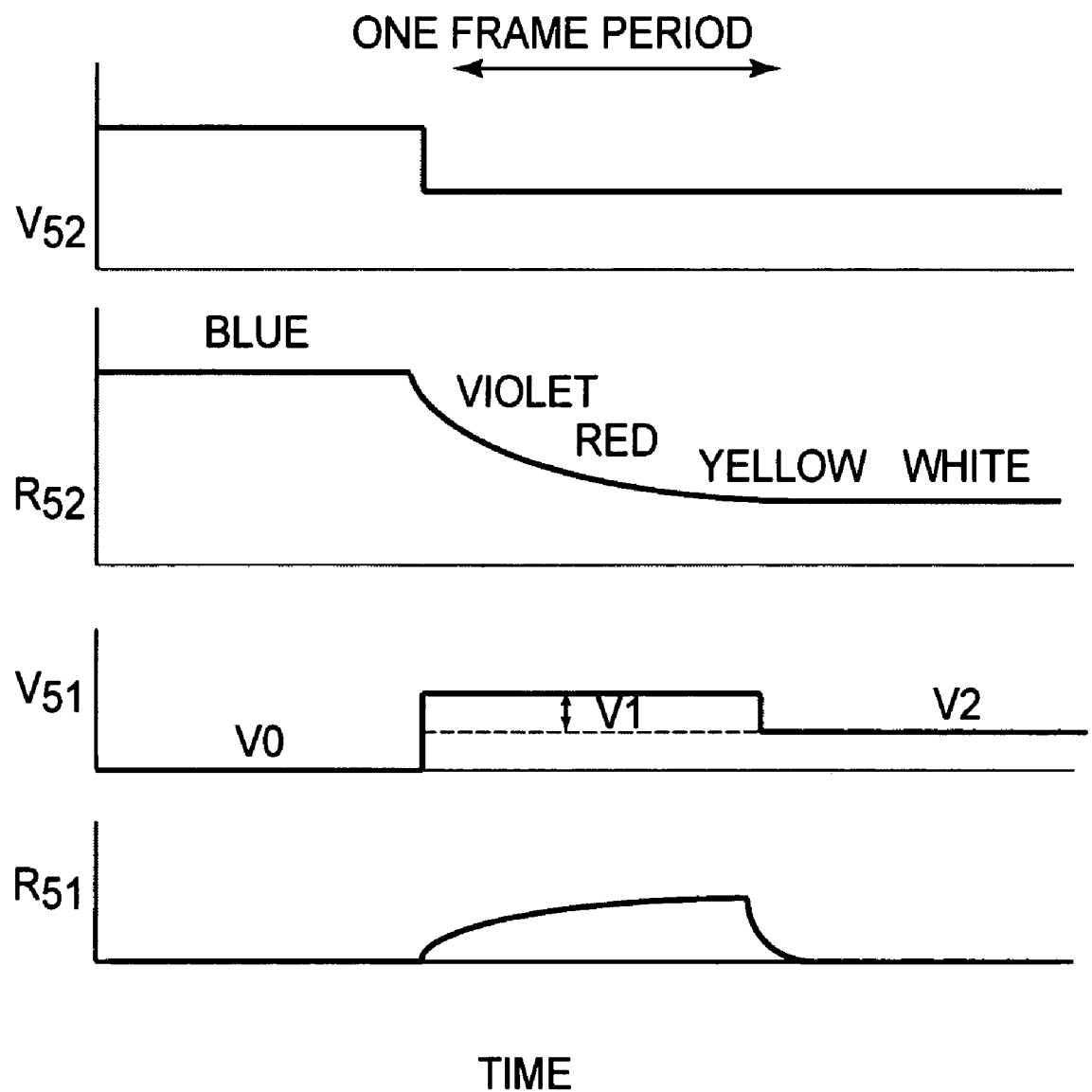
FIG. 7 is a diagram showing an applied voltage and a change in retardation with time of the color display apparatus of the present invention.

Incidentally, when the display color after the switching includes green, not white, a voltage for display after the switching is another value V2, not V0. At that time, the voltage is applied by superposing the V1 value on V2, whereby green brighter than that at the time of displaying original green is displayed only for one frame period. At that time, greyish green mixed with the transitional response at the first pixel is observed only for one frame period. FIG. 7 shows a voltage therefor and a response of retardation.

Figure 8:
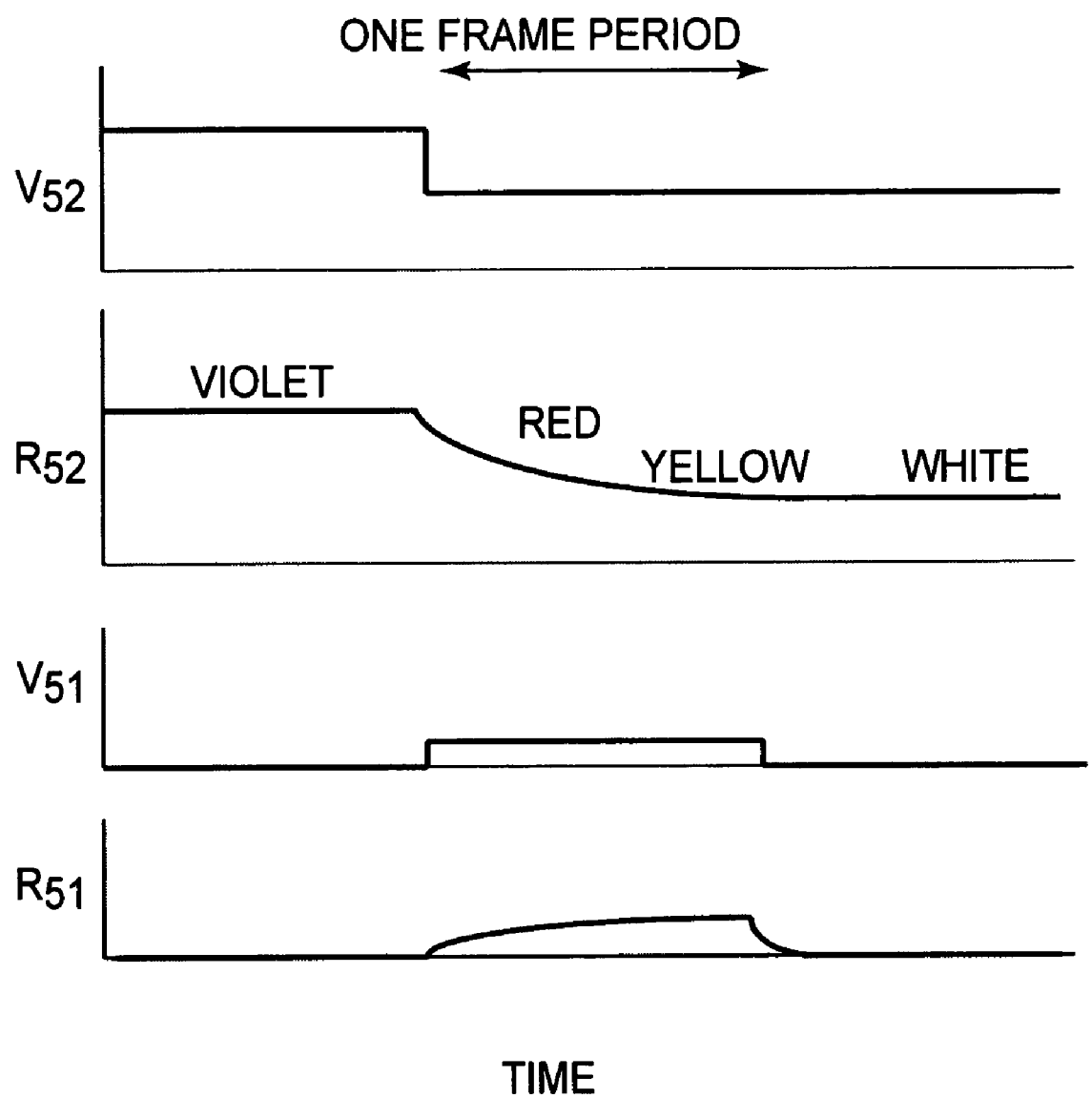
FIG. 8 is a diagram showing an applied voltage and a change in retardation with time of the color display apparatus of the present invention.

FIG. 8 shows voltages at the first and second subpixels and retardation response when the first subpixel is changed from violet to white. A point different from FIG. 6 is that a voltage and a retardation at the first subpixel before switching are smaller than those in FIG. 6 and a voltage for providing a retardation of 550 nm corresponding to violet is applied.

At this time, the transitional color appearing at the first subpixel is visible as a color averagely closer to red than the case of FIG. 6. In this case, it is impossible to mix the color with green of the second subpixel to completely produce an achromatic color but a brightness of green, i.e., V1' is determined so that the color is as close to the achromatic color as possible.

More specifically, an averaged color of the transitional response at the first subpixel is represented by two components of pure blue and pure red to display green equal to the average value thereof at the second subpixel.

Alternatively, the voltage at the second subpixel may be determined in advance so as to make the color visible as close to the achromatic color as possible. It is also possible to prepare a table including voltages at the first subpixel before and after the switching and a voltage value determined as the color close to the achromatic color by eyes at the second subpixel and to calculate a voltage at the second subpixel by making reference to the table.

By this, the phenomenon that only the edge portion of the moving body is colored a different chromatic color is prevented, so that it is possible to effect natural motion picture display.

Incidentally, with respect to others, e.g., such as the transitional state from red to white, the display color at the time of the transitional response is yellow and red and yellow are the same warm color system to be close to each other as a systematic color, so that there is a possibility that the coloring at the edge portion is not so worrisome. On the other hand, by the voltage correction at the subpixel 51, inconformity is rather increased in some cases. In such cases, the above described voltage correction need not necessarily be performed while black display is retained at the second subpixel 51.

The present invention is also applicable to the conventional OD method. Even when the OD method is used at the first subpixel 52, display of a hue different from a desired color is effected for one frame period.

In order to make the hue an achromatic color, a voltage is further superposed on a voltage determined by the OD method at the second subpixel.

Next, a control circuit of the color display apparatus of the present invention will be described by a system block diagram of FIG. 9.

Figure 9:
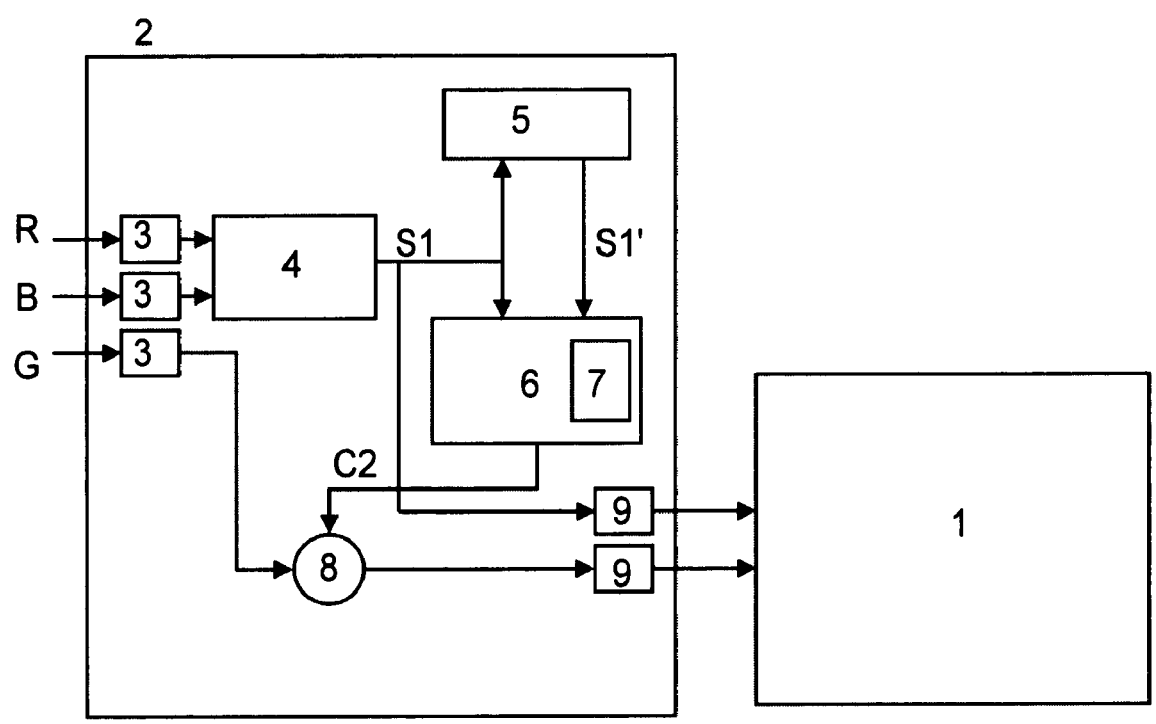
FIG. 9 is a system block diagram of the color display apparatus of the present invention.

In FIG. 9, a control circuit 2 is a circuit for controlling a display panel 1 where pixels are arranged in a matrix fashion on the basis of an input image signal.

Input image signals of RGB are converted into digital signals by A/D converters 3, respectively, and thereafter the red and blue input image signals enter a signal conversion circuit 4 to be converted into a signal S1 corresponding to a voltage for driving the first subpixel 52.

The converted signal S1 for the first subpixel is inputted into a correction signal calculation circuit 6 together with a previous signal S1', for the first subpixel, read from a memory 5. At the same time, the newly inputted signal S1 for the first subpixel is substituted for the previous signal S1' for the first subpixel and is stored in the memory 5.

The correction signal calculation circuit 6 contains a reference Table 7 and calculates and outputs a correction signal C2 for the second subpixel from the previous signal S1' for the first subpixel and the newly inputted signal S1 for the first subpixel.

The outputted correction signal C2 and the digital-converted G pixel signal are added by an adding circuit 8 and outputted as a signal S2 for the second subpixel. The signal S1 for the first subpixel and the signal S2 for the second subpixel are, after being converted by DA converters 9, sent as a drive voltage signal to a display portion 1.

Figure 10:
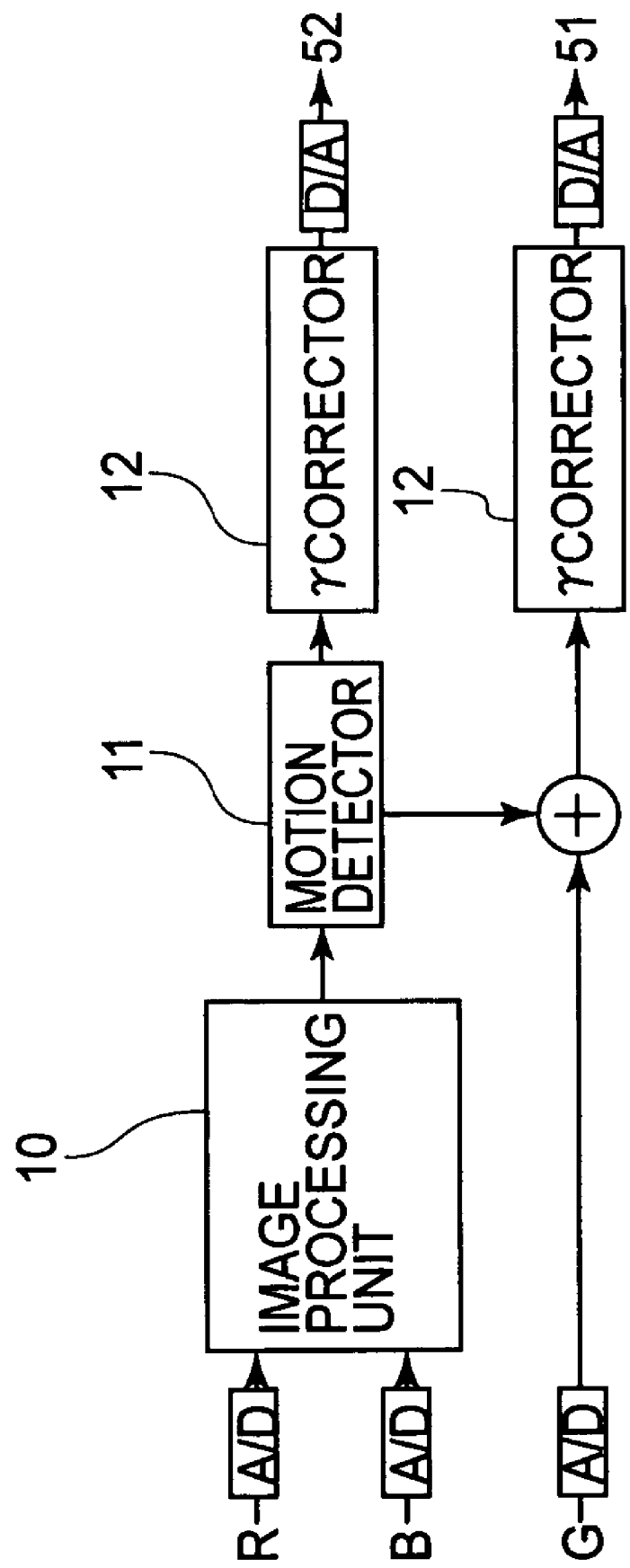
FIG. 10 is another system block diagram of the color display apparatus of the present invention.
Figure 11:
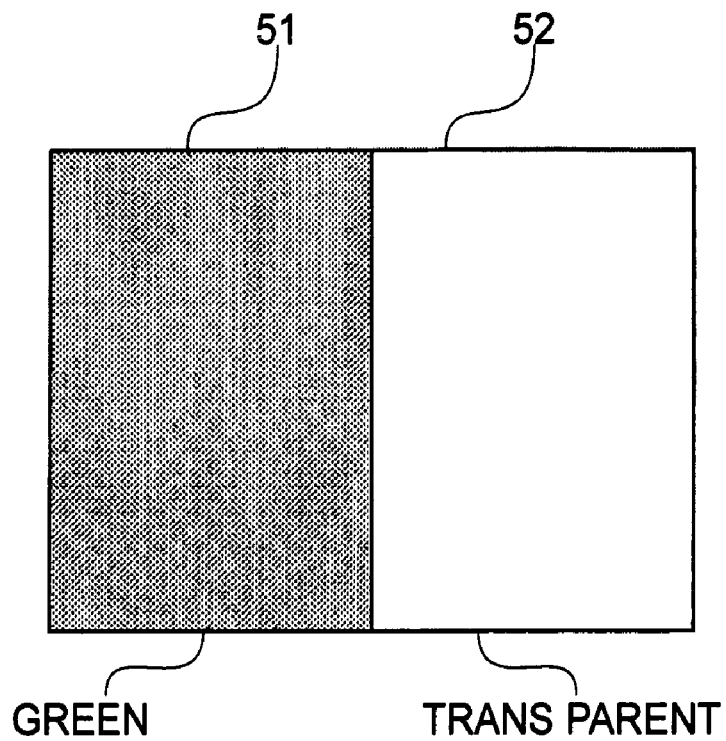
FIG. 11 is a view showing a one pixel structure in Embodiment 1 of the present invention.

FIG. 10 is an example of another control circuit.

In FIG. 10, the signal conversion circuit 4 in the control circuit 2 of FIG. 9 constitutes an image processing portion 10. In place of the memory 5 and the correction signal calculation circuit 6, a detection portion 11 is disposed to generate a signal for the first subpixel and a correction signal from an amount of change thereof. The correction signal is added to input image signals by the adding circuit 7.

After through these circuits or portions, with respect to each of the signal for the first subpixel and the signal for the second subpixel, gamma correction is performed at a γ correction portion 12 to effect D/A conversion, so that the signals are outputted to the display device for a predetermined period. Incidentally, when movement is detected in this block, a predetermined amount may be obtained from a change amount by using a look-up table or the calculation may also be performed every frame by using a standardized numerical formula.

Before the γ correction, an OD method-based processing may also be performed by disposing an overdrive processing portion (not shown).

Next, the present invention is applied to the methods (1) to (3) which permits many multiple colors in the above described constitution of FIG. 1(a).

With respect to the method (1), the occurring phenomenon is the same as the case of the above described basic constitution. Accordingly, measure to the phenomenon is also the same as described above, so that in the case where the coloring phenomenon is caused to occur at the edge portion during motion picture display, at the time of switching the still picture, or during the dithering by which it is superposed on the entire image, the second subpixel may be controlled so as to compensate the phenomenon.

Figure 3:
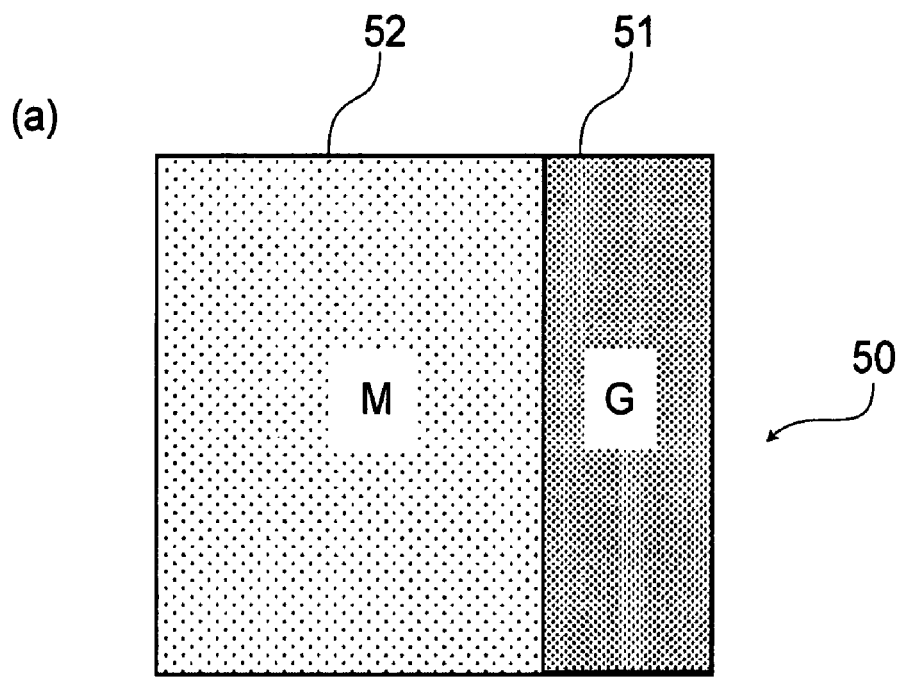
FIGS. 3(a) and 3(b) are views showing another structure of one pixel of the liquid crystal display device used in the color display apparatus of the present invention.
Figure 3:
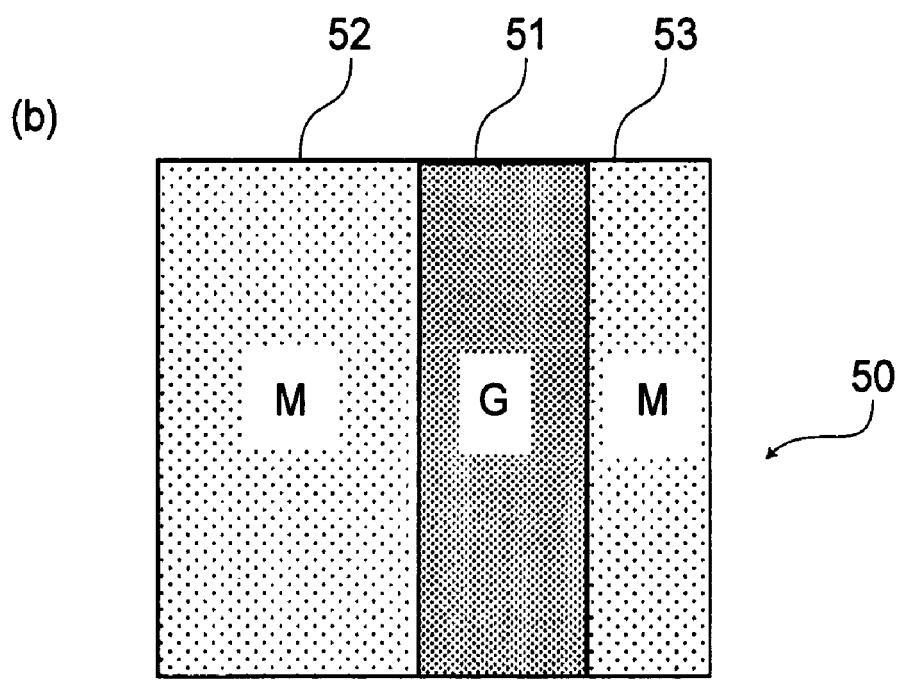

In the method (2), the green color filter is used at the second subpixel 51 and the magenta color filter is used at the first subpixel 52 (FIG. 3). In such a case, at the first subpixel 52, magenta is displayed in the brightness change area ranging from black to a maximum brightness, and magenta and red display is effected in the hue change area exceeding the maximum brightness.

Accordingly, in such a pixel constitution, e.g., in the case where switching from blue to black is performed, a change in color in the order of blue, magenta and red is observed in the hue change area and display of an intermediary tone of magenta is observed in the brightness change area. In other words, although red display is effected momentarily, magenta display is effected in almost all the frame period. More specifically, when a situation in which a blue moving body is moved in a black background is considered, the display color at the edge portion of the moving body, at the time of still picture switching, or in the entire image during the dithering is cooled the magenta system color, not the blue or monochromatic system color.

Therefore, in order to alleviate such a phenomenon, with respect to an area corresponding to a portion, such as the edge portion of the moving body, at which image switching is performed, such a driving method that a display color which cancels the above described unintended display color is outputted to the first subpixel 52 simultaneously when such a drive control that the hue is changed at the second subpixel 51 is effected, is adopted.

More specifically, as used, in the case where the switching from blue to black is performed as described above, the display state is not changed only at the first subpixel 52 while retaining black display at the second subpixel 51 but the magenta systematic color is displayed in the transitional response state at the first subpixel 52. For this reason, a voltage is applied so that the second subpixel 51 is placed in the ON state or the intermediary tone state at the time of transitional response.

Further, by constituting the present invention in such a manner, it is possible to effect monochromatic (achromatic color) display of the mixed color of magenta and green while preventing magenta from being visible in the transitional state from blue to black. By this, the phenomenon that only the edge portion is colored a different systematic color is prevented, so that it is possible to attain natural picture display also with respect to the entire image during the dithering.

Incidentally, with respect to the others, such as the transitional state from, e.g., red to black, the display color at the time of the transitional response is magenta in almost all the frame period and also with respect to the transitional state from blue to red, the display color is similarly magenta. Accordingly, as the countermeasure, a similar processing is controlled so that the display color close to the achromatic color is observed, whereby it is possible to alleviate inconformity at the edge portion during the motion picture display, at the time of still picture switching, or in the entire image during the dithering.

In the method (3), in addition to the method (2), at least either one of the color filters of red and blue is added at the second subpixel 51 (FIG. 5), so that by utilizing this, it is possible to make the display color colorless with respect to all the possible transitional colors at the first subpixel. In the case of the voltage correction using the above described method (2), compensation is intended to be performed by using only the green pixel. Here, as described above, as described above, in the case of performing the switching from blue to black, magenta is displayed in almost all the frame period but red is displayed momentarily.

With respect to this red, it cannot be made colorless only with the green color filter but can be colorless by utilizing the blue color filter.

As described above, in the case of the method (3), it becomes possible to effectively alleviate the coloring phenomenon at the edge portion, at the time of still picture switching, or in the entire image during the dithering by utilizing all the color filters of the three primary colors depending on the status.

In the present invention, control of the primary color filter pixel disposed at the second subpixel is appropriately performed depending on the hue change status at the first subpixel 52, whereby it becomes possible to alleviate inconformity during the motion picture display of the ECB color LED. Incidentally, in the description hereinabove, green is principally used as the color of the primary color filter but is becomes possible to effect compensation drive even in the display device using principally red therefor as described in the explanation for the above mentioned device. Further, the same explanation holds for blue.

Further, in FIGS. 6 to 8, the discussion is made on the premise that the response is completed in one frame period but the voltage correction method in the present invention is also effective even in the case of response of liquid crystal over a plurality of frames.

Next, the driving method of the present invention will be described more specifically with reference to FIGS. 1-7.

Incidentally, a common constitution of the liquid crystal display device as an example of the color display device used in the embodiments of the present invention is as follows.

As a structure of a liquid crystal layer, two glass substrates subjected to vertical alignment treatment are applied to each other to prepare a cell. As a liquid crystal material, a liquid crystal material (Model: "MLC-6608", mfd. by Merck & Co., Inc.) having a dielectronic anisotropy ($\Delta\epsilon$) which is negative is used.

Further, as the substrate structure used, one of the substrates is an active matrix substrate provided with thin film transistors (TFTs) and the other substrate is a substrate provided with color filters. Here, a shape of pixels and a color filter constitution are changed appropriately depending on the Embodiments. Incidentally, the number of pixels for TFTs is 800×3 in columns and 600 in rows.

Further, as a pixel electrode on the TFT side, an aluminum electrode is used to provide a reflection-type constitution.

Between an upper substrate (color filter substrate) and a polarization plate, a wide-band λ/4 plate (phase-compensation plate capable of substantially satisfying ¼ wavelength condition in visible light region) is disposed as a photo-compensation plate, thereby to provide such a constitution that a dark state is given under no voltage application and a bright state is given under voltage application when reflection-type display is effected.

Embodiment 1

Figure 12:
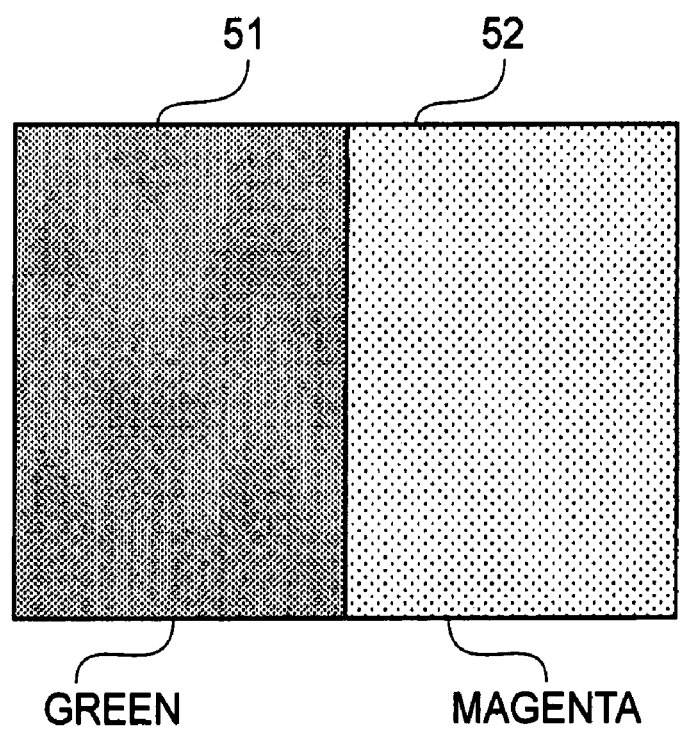
FIG. 12 is a view showing a one pixel structure in Embodiment 2 of the present invention.

A pixel constitution of a liquid crystal display device used in Embodiment 1 is given, as shown in FIG. 12, by dividing one unit pixel into two subpixels and providing a green color filter to only a second subpixel 51 which is one of the subpixels. Incidentally, the liquid crystal display device includes unit pixels of 1200 in columns and 600 in row, and the cell thickness of this device 5 microns.

Further, at a unit pixel, an amount of retardation at the time of applying a voltage of ±5 V to a first subpixel 52 being a transparent subpixel provided with no color filter is about 300 nm.

When such a liquid crystal display device is subjected to image display by changing the voltage, with respect to the second subpixels 51 with the green color filter, a change in transmittance depending on the applied voltage value is shown in an area of not more than 3 V to provide a continuous gradation characteristic. On the other hand, with respect to the first subpixels 52 being transparent subpixels provided with no green color filter, blue display is effected under application of 5 V and red display is effected under application of 3.8 V, so that it is found that the liquid crystal panel in this Embodiment effects display with respect to the three primary colors. Further, in the area of not more than 3 V, monochromatic continuous gradation display depending on the applied voltage is effected. A threshold value of this liquid crystal display device is about 2 V and the monochromatic continuous gradation display is effected in the range of 2-3 V.

Next, in the liquid crystal display device having such a constitution, as a background color, black, white, an intermediary tone color, and red are selected, and a blue rectangular white having a size of unit pixels of 200 in columns and 100 in rows is prepared as a moving body and is moved so as to be shifted by one unit pixel portion per one frame (1/60 sec) in a direction from left to right.

Here, in the case where black is selected as the background color, on the background, all the pixels are supplied with 0 V. Further, with respect to the window as the moving body, 5 V is applied to the first subpixels 52 and 0 V is applied to the second subpixels 51. Further, in this state, when the window is moved, left and right edge portions of the window are respectively colored magenta. Therefore, when observation is performed by applying 2.5 V to respective second subpixels 51, at the left and right and portions of the window, each by one unit pixel portion, the coloring at the edge portions becomes unannoying.

Further, in the case where white is selected as the background color, on the background, 3 V is applied to the first subpixels 52 and 0 V is applied to the second subpixels 51. Further, with respect to the window as the moving body, 5 V is applied to the first subpixels 52 and 0 V is applied to the second subpixels 51. Further, in this state, when the window is moved, a response speed is slow, so that left and right edge portions of the window are respectively colored magenta together with an occurrence of a tailing phenomenon.

Therefore, with respect to one unit pixel portion each at the left and right edge portions of the window, 2.5 V is applied to the first subpixel 52 located at the left end, whereby the response speed from blue to white is increased at the left end, so that response within one frame is realized. However, only by this, the left and right edge portions of the window are respectively colored magenta. For this reason, with respect to one unit pixel of each at the left and right edge portions of the window, 2.5 V is applied to the respective subpixels 51 to perform observation, so that the coloring at the edge portions becomes unannoying.

Further, in the case where an intermediary tone is selected as the background color, on the background, 2.5 V is applied to the first subpixels 52 and 0 V is applied to the second subpixels 51. Further, with respect to the window as the moving body, 5 V is applied to the first subpixels 52 and 0 V is applied to the second subpixels 51. Further, in this state, when the window is moved, a response speed is slow, so that left and right edge portions of the window are respectively colored magenta together with an occurrence of a tailing phenomenon.

Therefore, with respect to one unit pixel portion each at the left and right edge portions of the window, 2.2 V is applied to the first subpixel 52 located at the left end, whereby the response speed from blue to white is increased at the left end, so that response within one frame is realized. However, only by this, the left and right edge portions of the window are respectively colored magenta. For this reason, with respect to one unit pixel of each at the left and right edge portions of the window, 2.5 V is applied to the respective subpixels 51 to perform observation, so that the coloring at the edge portions becomes unannoying.

Further, in the case where red is selected as the background color, on the background, 3.8 V is applied to the first subpixels 52 and 0 V is applied to the second subpixels 51. Further, with respect to the window as the moving body, 5 V is applied to the first subpixels 52 and 0 V is applied to the second subpixels 51. Further, in this state, when the window is moved, a response speed is slow, so that left and right edge portions of the window are respectively colored magenta together with an occurrence of a tailing phenomenon.

Therefore, with respect to one unit pixel portion each at the left and right edge portions of the window, 3.4 V is applied to the first subpixel 52 located at the left end, whereby the response speed from blue to red is increased at the left end, so that response within one frame is realized. However, only by this, the left and right edge portions of the window are respectively colored magenta. For this reason, with respect to one unit pixel of each at the left and right edge portions of the window, 2.5 V is applied to the respective subpixels 51 to perform observation, so that the coloring at the edge portions becomes unannoying.

Embodiment 2

A pixel constitution of a liquid crystal display device used in Embodiment 2 is given, as shown in FIG. 12, by dividing one unit pixel into two subpixels and providing a green color filter to and a magenta color filter to a first subpixel 52. Incidentally, similarly as in FIG. 1, the liquid crystal display device includes unit pixels of 1200 in columns and 600 in rows, and the cell thickness of this device 5 microns.

When such a liquid crystal display device is subjected to image display by changing the voltage, with respect to the subpixels with the green color filter, a change in transmittance depending on the applied voltage value is shown in an area of not more than 3 V to provide a continuous gradation characteristic. On the other hand, with respect to the first subpixels 52 provided with the magenta color filter, blue display is effected under application of 5 V and red display is effected under application of 3.8 V, so that it is found that the liquid crystal panel in this Embodiment effects display with respect to the three primary colors. Further, in the area of not more than 3 V, continuous gradation display of magenta depending on the applied voltage is effected. A threshold value of this display device is about 2 V and the continuous gradation display range is in the range of 2-3 V.

Next, in the liquid crystal display device having such a constitution, as a background color, black, an intermediary tone color, and red are selected, and a blue rectangular white having a size of unit pixels of 200 in columns and 100 in rows is prepared as a moving body and is moved so as to be shifted by one unit pixel portion per one frame (1/60 sec) in a direction from left to right.

Here, in the case where black is selected as the background color, on the background, all the pixels are supplied with 0 V. Further, with respect to the window as the moving body, 5 V is applied to the first subpixels 52 and 0 V is applied to the second subpixels 51. Further, in this state, when the window is moved, left and right edge portions of the window are respectively colored magenta. Therefore, when observation is performed by applying 2.5 V to respective second subpixels 51, at the left and right and portions of the window, each by one unit pixel portion, the coloring at the edge portions becomes unannoying.

Further, in the case where the intermediary tone color is selected as the background color, on the background, 2.5 V is applied to the first subpixels 52 and 2.5 V is similarly applied to the second subpixels 51. Further, with respect to the window as the moving body, 5 V is applied to the first subpixels 52 and 0 V is applied to the second subpixels 51. Further, in this state, when the window is moved, a response speed is slow, so that left and right edge portions of the window are respectively colored magenta together with an occurrence of a tailing phenomenon.

Therefore, with respect to one unit pixel portion each at the left and right edge portions of the window, 2.2 V is applied to the first subpixel 52 located at the left end, whereby the response speed from blue to white is increased at the left end, so that response within one frame is realized. However, only by this, the left and right edge portions of the window are respectively colored magenta. For this reason, with respect to one unit pixel of each at the left and right edge portions of the window, 2.7 V is applied to the respective subpixels 51 in order to increase a brightness of green to perform observation, so that the coloring at the edge portions becomes unannoying.

Further, in the case where red is selected as the background color, on the background, 3.8 V is applied to the first subpixels 52 and 0 V is applied to the second subpixels 51. Further; with respect to the window as the moving body, 5 V is applied to the first subpixels 52 and 0 V is applied to the second subpixels 51. Further, in this state, when the window is moved, a response speed is slow, so that left and right edge portions of the window are respectively colored magenta together with an occurrence of a tailing phenomenon.

Therefore, with respect to one unit pixel portion each at the left and right edge portions of the window, 3.4 V is applied to the first subpixel 52 located at the left end, whereby the response speed from blue to red is increased at the left end, so that response within one frame is realized. However, only by this, the left and right edge portions of the window are respectively colored magenta. For this reason, with respect to one unit pixel of each at the left and right edge portions of the window, 2.5 V is applied to the respective subpixels 51 to perform observation, so that the coloring at the edge portions becomes unannoying.

Embodiment 3

Figure 13:
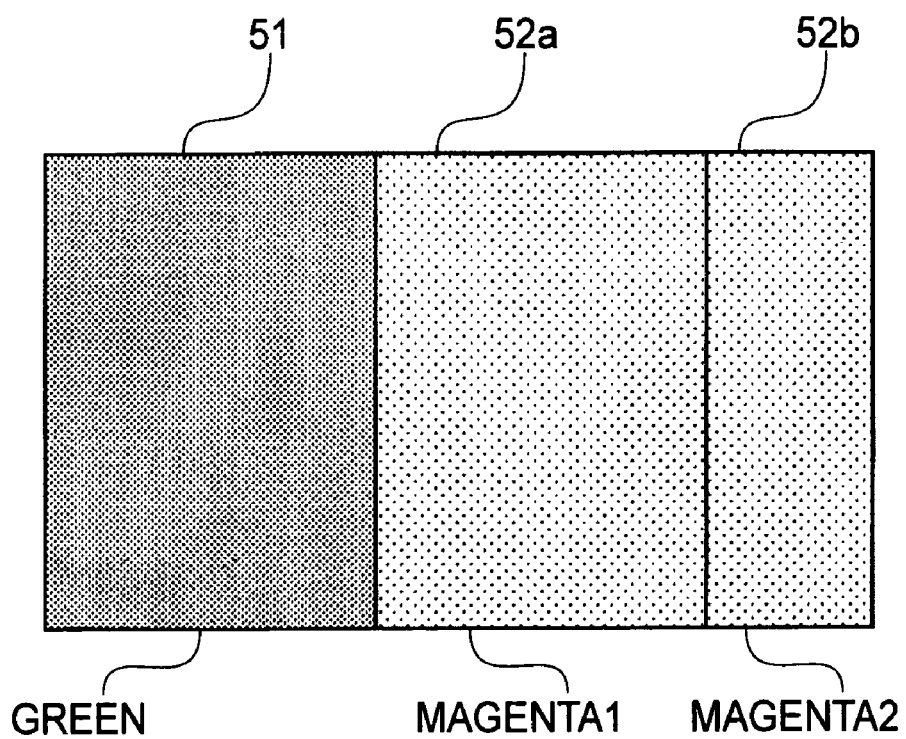
FIG. 13 is a view showing a one pixel structure in Embodiment 3 of the present invention.

A pixel constitution of a liquid crystal display device used in Embodiment 3 is given, as shown in FIG. 13, by dividing one unit pixel into three subpixels and providing a green color filter to one second subpixel 51 and a magenta color filter to remaining two first subpixel 52a and 52b at an areal ratio of 1:2. Incidentally, similarly as in FIG. 1, the liquid crystal display device includes unit pixels of 800 in columns and 600 in rows, and the cell thickness of this device 5 microns. Further, in this case, when a voltage of ±5 V is applied to the magenta subpixels at the first subpixels 52 provided with the magenta color filter, an amount of retardation is about 300 nm.

When such a liquid crystal display device is subjected to image display by changing the voltage, with respect to the subpixels with the green color filter, a change in transmittance depending on the applied voltage value is shown in an area of not more than 3 V to provide a continuous gradation characteristic. On the other hand, with respect to the first subpixels 52a and 52b provided with the magenta color filter, blue display is effected under application of 5 V and red display is effected under application of 3.8 V, so that it is found that the liquid crystal panel in this Embodiment effects display with respect to the three primary colors. Further, in the area of not more than 3 V, continuous gradation display of magenta depending on the applied voltage is effected at the first subpixels 52a and 52b. Further, the first subpixels 52a and 52b are area-divided, so that it is possible to effect representation for four gradation levels as blue and red digital gradation levels by appropriately adjusting the display pixel. A threshold value of this display device is about 2 V and the continuous gradation display range is in the range of 2-3 V. Further, in this embodiment, red can be displayed at four gradation levels and their display states are represented by those of black, intermediary red 1, intermediary red 2, and red in this order from the dark state.

Next, in the liquid crystal display device having such a constitution, as a background color, the intermediary red 1 and the intermediary red 2 are selected, and a blue rectangular white having a size of unit pixels of 200 in columns and 100 in rows is prepared as a moving body and is moved so as to be shifted by one unit pixel portion per one frame (1/60 sec) in a direction from left to right.

Here, in the case where the intermediary red 1 is selected as the background color, on the background, 3.8 V is applied to the smaller first subpixels 52b of the first subpixels 52 and 0 V is applied to the larger first subpixels 52a of the first subpixels 52. Further, 0 V is applied to the second subpixels 51. Further, with respect to the window as the moving body, 5 V is applied to the first subpixels 52 and 0 V is applied to the second subpixels 51. Further, in this state, when the window is moved, a response speed is slow, so that left and right edge portions of the window are respectively colored magenta together with an occurrence of a tailing phenomenon.

Therefore, with respect to one unit pixel portion each at the left and right edge portions of the window, 3.4 V is applied to the first subpixel 52 located at the left end, whereby the response speed from blue to red is increased at the left end, so that response within one frame is realized. However, only by this, the left and right edge portions of the window are respectively colored magenta. For this reason, similarly as in FIG. 2, with respect to one unit pixel of each at the left and right edge portions of the window, 2.5 V is applied to the respective subpixels 51 to perform observation, so that the coloring at the edge portions becomes almost unannoying.

Further, in the case where the intermediary red 2 is selected as the background color, on the background, 0 V is applied to the smaller first subpixel 52b of the first subpixels 52 and 3.8 V is applied to the larger first subpixel 52a of the first subpixels 52. Further, 0 V is applied to the second subpixels 51. Further, with respect to the window as the moving body, 5 V is applied to the first subpixels and 0 V is applied to the second subpixels. Further, in this state, when the window is moved, a response speed is slow, so that left and right edge portions of the window are respectively colored magenta together with an occurrence of a tailing phenomenon.

Therefore, with respect to one unit pixel portion each at the left and right edge portions of the window, 3.4 V is applied to the first subpixel 52 located at the left end, whereby the response speed from blue to red is increased at the left end, so that response within one frame is realized. However, only by this, the left and right edge portions of the window are respectively colored magenta. For this reason, similarly as in Embodiment 2, with respect to one unit pixel of each at the left and right edge portions of the window, when 2.5 V is applied to the respective subpixels 51 to perform observation, the coloring at the edge portions becomes unannoying.

Embodiment 4

Figure 14:
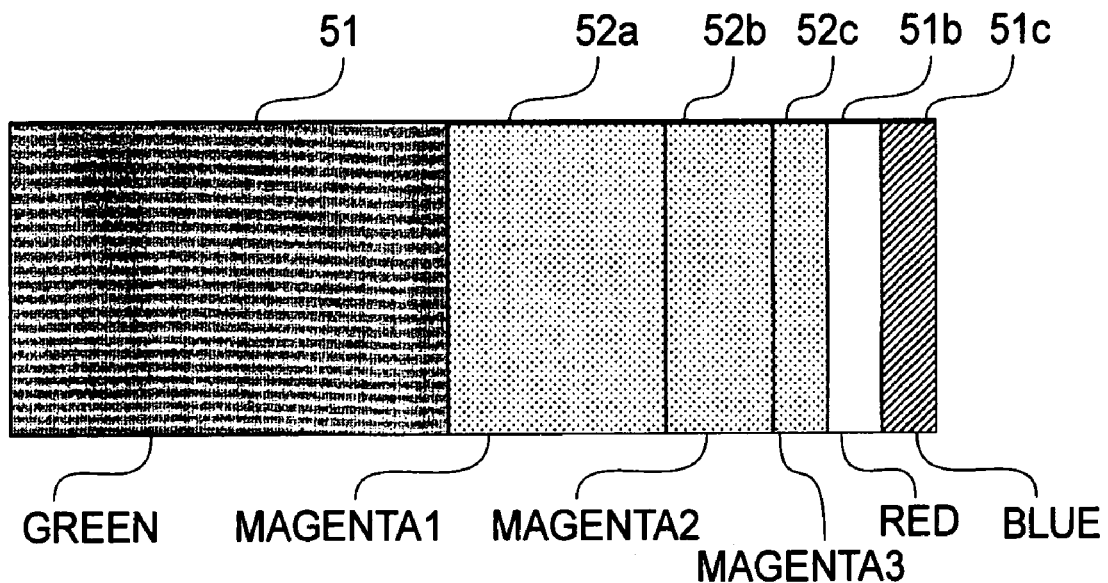
FIG. 14 is a view showing a one pixel structure in Embodiment 4 of the present invention.

A pixel constitution of a liquid crystal display device used in Embodiment 4 is given, as shown in FIG. 14, by dividing one unit pixel into six subpixels to form three first subpixels 52a, 52b and 52c and three second subpixels 51a, 51b and 52c have an areal ratio of 4:2:1 and are provided with a magenta color filter. Further, two second subpixels 51b and 51c of the three second color filters 51a, 51b and 51c have the same area as the first subpixels 52c having a smallest area of the first subpixels 52a, 52b and 52c, and are provided with a blue color filter and a red color filter, respectively.

Further, the remaining one subpixels 51a is provided with a green color filter. Incidentally, the liquid crystal display device of this embodiment includes unit pixels of 400 in columns and 600 in rows, and other conditions, such as the cell thickness are the same as those in Embodiments 1-3. By this constitution, as described above, it is possible to effect analog full-color display.

Next, in the liquid crystal display device having such a constitution, as a background color, 50%-intermediary red is selected, and a blue rectangular white having a size of unit pixels of 100 in columns and 100 in rows is prepared as a moving body and is moved so as to be shifted by one unit pixel portion per one frame (1/60 sec) in a direction from left to right.

In this case, the background color is the 50%-intermediary red, so that on the background, 3.8 V is applied to the two subpixels 52a and 52b of the first subpixels 52a, 52b and 52c so as to effect red display. However, only by this, a brightness is 3/7 a maximum brightness of red, so that 2.5 V is applied to the subpixel 51b so as to provide a 50%-brightness at the subpixel 51b, provided with the red color filter, of the second subpixels 51a, 51b and 51c. Further, 0 V is applied to the blue and green subpixels 51a and 51c, whereby a brightness which is 3.5/7 of the maximum brightness of red, so that the background color becomes the 50%-intermediary red.

Further, with respect to the window as the moving body, 5 V is applied to all the first subpixels 52a, 52b and 52c. Further, 3 V is applied to the subpixels 51c provided with the blue color filter of the second subpixels 51a, 51b and 51c, and 0 V is applied to the other subpixels 51a and 51b. Further, in this state, when the window is moved, a response speed is slow, so that left and right edge portions of the window are respectively colored magenta together with an occurrence of a tailing phenomenon.

Therefore, with respect to one unit pixel portion each at the left and right edge portions of the window, 3.4 V is applied to the first subpixels 52a, 52b and 52c located at the left end while applying 2.7 V to the subpixel 51b, provided with the red color filter, of the second subpixels 51a, 51b and 51c located at the left end, whereby the response speed from blue to red is increased at the left end, so that response within one frame is realized. However, only by this, the left and right edge portions of the window are respectively colored magenta. For this reason, similarly as in FIG. 3, with respect to one unit pixel of each at the left and right edge portions of the window, 2.5 V is applied to the subpixel 51a, provided with the green color filter, of the respective subpixels 51 to perform observation, so that the coloring at the edge portions becomes almost unannoying.

Embodiment 5

Investigation is made by using a liquid crystal display device having the same constitution as Embodiment 2. In this case, when the entire picture area is switched from a blue display state to a red display state, magenta is observed momentarily. Therefore, when an observation is performed by applying 2.5 V to all the second subpixels 51 at the panel surface only in one frame immediately after the image switching, the coloring of magenta becomes unannoying.

Example 6

Investigation is made by using a liquid crystal display device having the same constitution as Embodiment 2. In this case, on a black background, display of 50%-intermediary tone of blue is effected at rectangular 100×100 pixels by using dithering. As a dither matrix used in this case, a Bayer-type 4×4 matrix represented by a numerical formula 1.

$$\begin{pmatrix} 1 & 9 & 3 & 11 \\ 13 & 5 & 15 & 7 \\ 4 & 12 & 2 & 10 \\ 16 & 8 & 14 & 6 \end{pmatrix}$$

A display image is divided into blocks each of 4 pixels×4 pixels and constituted by 25 blocks in rows and 25 blocks in columns. A display state in each of the blocks is:

$$\begin{pmatrix} ON & OFF & ON & OFF \\ OFF & ON & OFF & ON \\ ON & OFF & ON & OFF \\ OFF & ON & OFF & ON \end{pmatrix}$$

In the above, ON represents blue display and OFF represents black display. By this, blue is displayed at 50%-intermediary level by a spatial color mixture effect. This block is repeated 25×25 times, so that the rectangle of 100×100 pixels is displayed.

When movement is performed from this display state of the rectangle only by one dot, switching from blue to black or switching from black to blue is performed at all the pixels in the rectangle. As a result, a transitional state of switching is observed.

More specifically, in the process of switching the entire rectangle is cooled magenta. Therefore, with respect to pixels at which an image state is changed, i.e., all the pixels in the rectangle in this embodiment, 2.5 V is applied to the second subpixels 51. When an observation is performed with respect to such a driven panel, the coloring of magenta at the time of image switching becomes unannoying even in the case of using the dithering.

Example 7

Investigation is made by using a liquid crystal display device having the same constitution as Embodiment 6. In this case, on a black background, display of 25%-intermediary tone of blue is effected at rectangular 100×100 pixels by using dithering.

A display state in each of the blocks is:

$$\begin{pmatrix} ON & OFF & ON & OFF \\ OFF & OFF & OFF & OFF \\ ON & OFF & ON & OFF \\ OFF & OFF & OFF & OFF \end{pmatrix}$$

In the above, ON represents blue display and OFF represents black display. By this, blue is displayed at 25%-intermediary level by a spatial color mixture effect. This block is repeated 25×25 times, so that the rectangle of 100×100 pixels is displayed.

When movement is performed from this display state of the rectangle only by one dot, switching from blue to black or switching from black to blue is performed at odd-numbered row pixels in the rectangle. On the other hand, at even-numbered row pixels, the display state is always the OFF state, thus causing no change in state. As a result, a transitional state of switching is observed only at the odd-numbered row pixels.

More specifically, in the process of switching the odd-numbered row pixels in the rectangle is cooled magenta. Therefore, with respect to pixels at which an image state is changed, i.e., all the odd-numbered row pixels in the rectangle in this embodiment, 2.5 V is applied to the second subpixels 51. When an observation is performed with respect to such a driven panel, the coloring of magenta at the time of image switching becomes unannoying even in the case of using the dithering.

More specifically, it is sufficient to effect such a drive that the coloring is compensated with respect to the pixels at which the change in state is caused.

As described above, suppression in coloring at the edge portions during motion picture display, at the time of switching of still picture, and at the time when the display state is changed in the case of using the dithering is explained. Incidentally, in the Embodiments of the present invention, the case where the blue window is moved is performed but the similar concept holds even in the cases of movement of other display colors. With respect to these previous state, subsequent state, and background color, a look-up table (LUT) is prepared in advance and an applied voltage may be determined while making reference to the LUT and then may be outputted. Alternatively, a formula is standardized in advance on the basis of a certain law and calculation is made frame by frame, so that the result of the calculation may be outputted.

Further, in these embodiments, the TFT substrate is used, so that compensation by voltage modulation is performed but pulse modulation may also be performed in the case of effecting gradation display by performing pulse width modulation with the use of an MIM substrate or the like. Further, in the embodiments, the VA liquid crystal is used but it is possible to realize high-speed response by using the OCB mode, so that this is preferable for suppression in edge coloring phenomenon.

A similar driving method as in these embodiments can be used even in the case where a mode of changing a gap distance being an air (layer) thickness as a medium for an interference layer by a mechanical modulation instead of the liquid crystal display device having the ECB effect. Further, as the display apparatus, the same driving method as in these embodiments can also be used even in the case of using a particle movement-type display device in which the plurality of particles which are a medium on the basis of the constitution described in the embodiments are moved by voltage application.

Further, in the embodiments, the combination of green and magenta is described as the color filter but the embodiments are also applicable to combinations of red and cyan and of blue and yellow.

Further, in the embodiments, the TFT (substrate) is used as the drive substrate but a change in substrate constitution such that MIM is used instead of TFT or a switching device formed on a semiconductor substrate is used or a modification of the drive method such that a simple matrix drive or a plasma addressing drive is employed.

Further, as the substrate used in the case of forming the TFT (substrate), any substrate, such as an amorphous silicon TFT substrate, a low-temperature polysilicon TFT substrate, a high-temperature polysilicon TFT substrate, a semiconductor substrate (LCOS), or an active substrate obtained by transferring a semiconductor layer onto a glass or plastic substrate may be used.

INDUSTRIAL APPLICABILITY

As described hereinabove, the present invention can be utilized in a color display device (liquid crystal display device) which alleviates an undesirable coloring phenomenon occurring at the time of image switching such as motion picture display at the edge portions of the moving body or in the entire image and utilized in a driving method thereof.

The invention claimed is:

1. A color display device wherein a unit pixel is constituted by a plurality of subpixels including a first subpixel and a second subpixel which is provided with a color filter, and a medium changing an optical property depending on an applied voltage is disposed at each of the subpixels; the color display device comprising:
    means for applying, to the first subpixel, a voltage modulating the optical property of the medium disposed at the first subpixel in a range in which a brightness of light passing through the medium is changed and in a range in which the light passing through the medium assumes a chromatic color and a hue of the chromatic color is changed, and means for applying, to the second subpixel, a voltage modulating the optical property of the medium disposed at the second subpixel in a range in which a brightness of light passing through the medium is changed;

wherein the color display device further comprises means calculating, when display of the color display device is switched, a correction voltage of the second subpixel from a voltage applied to the first subpixel before the display is switched and a voltage applied to the first subpixel after the display is switched, and means applying, as a voltage applied to the second subpixel, a voltage obtained by superposing the correction voltage on a voltage determined by the display at the second subpixel in a predetermined period after the voltage applied to the first subpixel is switched; and wherein the correction voltage is a voltage which modifies a color of the second subpixel so as to produce an achromatic color by mixing a chromatic color, transitionally appearing at the first subpixel when the display is switched, with the color of the second subpixel.

2. A color display device according to claim 1, wherein a color filter satisfying a complementary color relationship with the color filter at the second subpixel is provided at the first subpixel.

3. A color display device according to claim 1 or 2, wherein the second subpixel is constituted by three subpixels provided with color filters of red, green and blue, and the means calculating the correction voltage of the second subpixel calculates a correction voltage which modifies a color of the second subpixel so as to produce an achromatic color by mixing a chromatic color, transitionally appearing at the first subpixel when the display is switched, with colors of the three subpixels.

4. A color display device according to claim 1, wherein the means calculating the correction voltage comprises a look-up table which determines the correction voltage from the voltage applied to the first subpixel before the switching and the voltage applied to the first subpixel after the switching.

5. A method of driving a color display device containing a medium changing an optical property depending on an applied voltage, wherein a unit pixel is constituted by a plurality of subpixels including a first subpixel and a second subpixel which is provided with a color filter, the method comprising steps of:

applying to the first subpixel a voltage modulating the optical property of the medium in a range in which a brightness of light passing through the medium is changed and in a range in which the light passing through the medium assumes a chromatic color and a hue of the chromatic color is changed, and applying to the second subpixel a voltage modulating the optical property of the medium in a range in which a brightness of light passing through the medium;

wherein the driving method further comprises a step in which, when display of the color display device is switched, a correction voltage of the second subpixel is calculated from a voltage applied to the first subpixel before the display is switched and a voltage applied to the first subpixel after the display is switched, and a step in which a voltage obtained by superposing the correction voltage on a voltage determined by the display at the second subpixel is applied to the second subpixel in a predetermined period after the voltage applied to the first subpixel is switched.

* * * * *

UNITED STATES PATENT AND TRADEMARK OFFICE
CERTIFICATE OF CORRECTION

PATENT NO. : 7,379,080 B2
APPLICATION NO. : 11/171191
DATED : May 27, 2008
INVENTOR(S) : Yasufumi Asao et al.

It is certified that error appears in the above-identified patent and that said Letters Patent is hereby corrected as shown below:

COLUMN 1:

Line 34, "have" should read --has--.

COLUMN 3:

Line 12, "blue," should read --blue, and--.

COLUMN 5:

Line 17, "bestmode" should read --best mode--; and
  Line 21, "bestmode" should read --best mode--.

COLUMN 6:

Line 35, "above described" should read --above-described--.

COLUMN 7:

Line 1, "above" should read --above- --;
  Line 17, "green" should read --green.--;
  Line 23, "constitutions." should read --constitution.--;
  Line 25, "above described" should read --above-described--;
  Line 35, "provided is" should read --provided and is--; and
  Line 41, "above described" should read --above-described--.

COLUMN 8:

Line 1, "of" should read --of a--; and
  Lines 59-60, "and on the other hand, such" should read --and on the other
    hand, there occurs a case where--.

Signed and Sealed this

Twenty-seventh Day of July, 2010

David J. Kappos
*Director of the United States Patent and Trademark Office*

COLUMN 9:

Line 5, "above described" should read --above-described--.

COLUMN 10:

Line 13, "above described" should read --above-described--; and
    Line 60, "After through" should read --After the signal has passed through--.

COLUMN 11:

Line 8, "above" should read --above- --;
    Line 11, "above described" should read --above-described--; and
    Line 43, "above described" should read --above-described--.

COLUMN 12:

Line 1, "period" should read --periods--;
    Line 14, "above described" should read --above-described--; and
    Line 38, "above mentioned" should read --above-mentioned--.

COLUMN 15:

Line 51, "Further;" should read --Further,--.

COLUMN 18:

Line 43, "case, a" should read --case, there is used a--.

COLUMN 19:

Line 67, "state," should read --states,--.

COLUMN 22:

Line 23, "passing" should read --passes--.